United States Patent
Yoshimoto et al.

(10) Patent No.: US 7,659,689 B2
(45) Date of Patent: Feb. 9, 2010

(54) POWER CONVERSION APPARATUS AND METHOD AND AUTOMOBILE

(75) Inventors: Kantaro Yoshimoto, Yokohama (JP); Yasuhiko Kitajima, Kamakura (JP); Kengo Maikawa, Yokosuka (JP)

(73) Assignee: Nissan Motor Co., Ltd, Yokohama-shi, Kanagawa (JP)

( * ) Notice: Subject to any disclaimer, the term of this patent is extended or adjusted under 35 U.S.C. 154(b) by 338 days.

(21) Appl. No.: 11/714,564

(22) Filed: Mar. 6, 2007

(65) Prior Publication Data
US 2007/0216338 A1    Sep. 20, 2007

(30) Foreign Application Priority Data

| Mar. 7, 2006 | (JP) | ............................. 2006-060990 |
| Mar. 15, 2006 | (JP) | ............................. 2006-071279 |

(51) Int. Cl.
    *H02P 27/04* (2006.01)
(52) U.S. Cl. ........................ 318/811; 318/599
(58) Field of Classification Search ................ 318/811, 318/599
    See application file for complete search history.

(56) References Cited

U.S. PATENT DOCUMENTS 5,684,376 A * 11/1997 Neiger et al. ............... 318/781
6,590,360 B2 * 7/2003 Hirata et al. ................ 318/727
6,960,893 B2 * 11/2005 Yoshida et al. .............. 318/127
2006/0273748 A1    12/2006 Yoshimoto et al.

FOREIGN PATENT DOCUMENTS

| JP | 06-178407 | 6/1994 |
| JP | 06-327102 | 11/1994 |
| JP | 2006-025518 | 1/2006 |
| JP | 2006-025520 | 1/2006 |
| JP | 2006-033955 | 2/2006 |
| JP | 2006-033956 | 2/2006 |

* cited by examiner

*Primary Examiner*—Walter Benson
*Assistant Examiner*—Renata McCloud
(74) *Attorney, Agent, or Firm*—Young Basile

(57) ABSTRACT

An apparatus and method for supplying a polyphase (AC) alternating current motor with driving voltages. A conversion unit is coupled to phases of the polyphase AC motor and includes a plurality of switching devices and includes, in at least one phase, a first switching device between a bus of an AC power supply and an output terminal, a second switching device between a bus of a direct current (DC) power supply and the output terminal, and a third switching device between a common bus for the AC power supply and the DC power supply and the output terminal. Driving voltages for the polyphase AC motor are generated by selecting a voltage from among voltages having potential values corresponding to the AC power supply and the DC power supply, and the selected voltage is used to operate a switch of the plurality of switching devices.

19 Claims, 21 Drawing Sheets

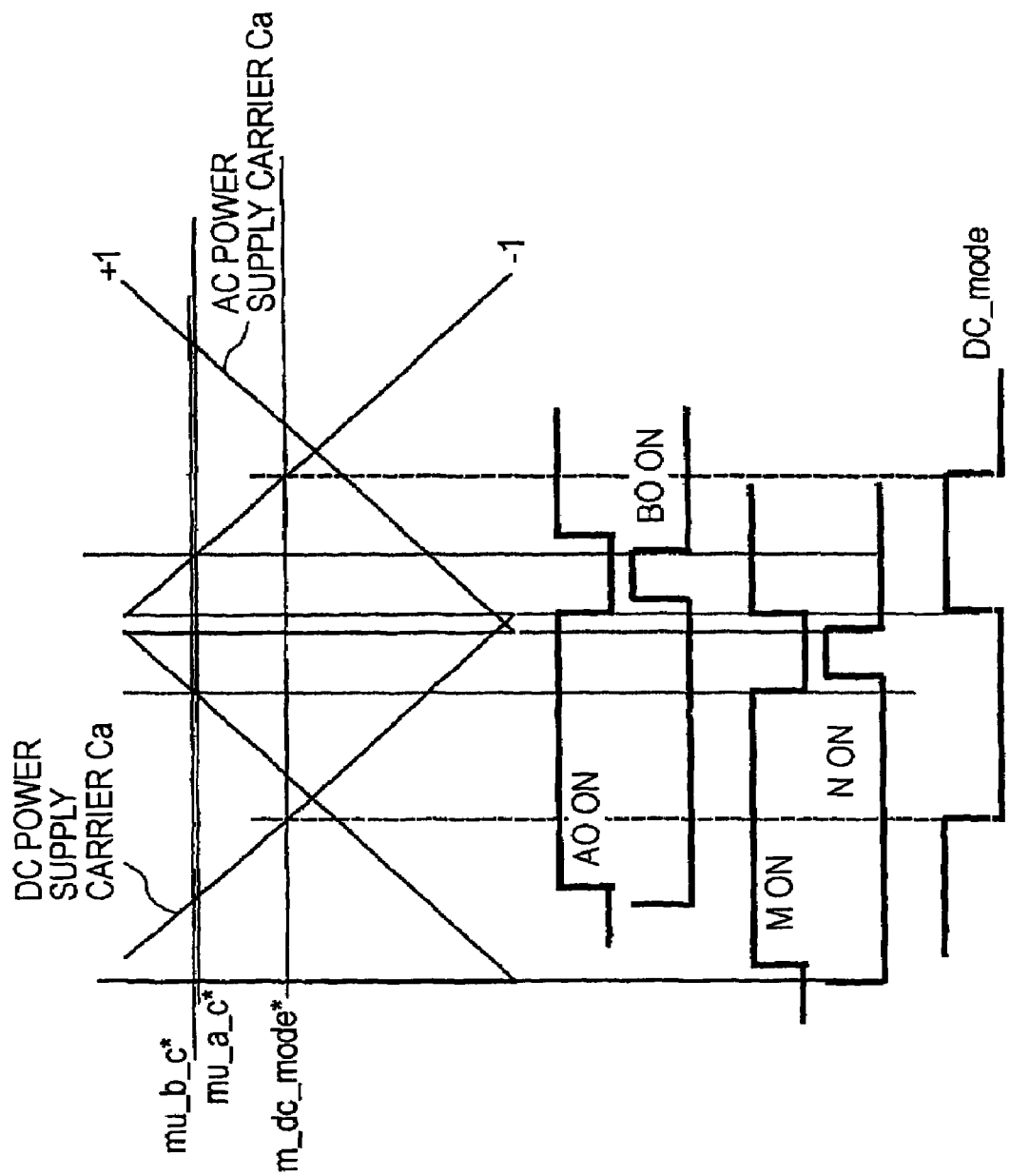

WHEN AC_sign = H

WHEN AC_sign = L

POWER CONVERSION APPARATUS AND METHOD AND AUTOMOBILE

CROSS-REFERENCE TO RELATED APPLICATION

This application claims priority from Japanese Patent Application Serial No. 2006-060990, filed Mar. 7, 2006, and No. 2006-071279, filed Mar. 15, 2006, each of which is incorporated herein in its entirety by reference.

TECHNICAL FIELD

The present invention relates to power conversion apparatuses and power conversion methods, and in particular, to a power conversion apparatus and power conversion method for supplying driving power for driving an electric motor.

BACKGROUND

A "Vehicle-mounted Charger for Electric Automobile" (see Japanese Unexamined Patent Application Publication No. 06-327102) that includes an inverter for converting DC (direct current) power of a storage battery into AC (alternating current) power is known. This known charger includes a power converter in an electric automobile including at least a storage battery, an inverter for converting DC power of the storage battery into AC power and a driving apparatus including an electric motor driven by the inverter. A control circuit is also provided. The control circuit controls the motor to operate on the basis of an output of the inverter since coil connections of the motor form a neutral point except when the storage battery is charged. When the storage battery is charged, the control circuit charges the storage battery by connecting power from a charging plug cord after disconnecting the coil connections in the motor.

In other words, a double-throw switch is provided with a motor coil as an AC reactor. The inverter performs both motor driving control and battery charging control and functions as a charger.

BRIEF SUMMARY OF THE INVENTION

Embodiments of a power conversion apparatus for supplying a polyphase alternating current motor with driving voltages are taught herein. One example comprises a conversion unit adapted to be coupled to phases of the polyphase alternating current (AC) motor, the conversion unit including a plurality of switching devices. The conversion unit includes, in at least one phase a first switching device between a bus of an AC power supply and an output terminal, a second switching device between a bus of a direct current (DC) power supply and the output terminal and a third switching device between a common bus for the AC power supply and the DC power supply and the output terminal. This embodiment also includes a power controller operable to generate driving voltages for the polyphase AC motor by selecting a voltage from among voltages having potential values corresponding to the AC power supply and the DC power supply and operable to use the selected voltage to operate a switch of the plurality of switching devices.

Methods for supplying a polyphase (AC) alternating current motor with driving voltages are also taught herein. One method uses a conversion unit coupled to phases of the polyphase AC motor where the conversion unit includes a plurality of switching devices and includes, in at least one phase, a first switching device between a bus of an AC power supply and an output terminal, a second switching device between a bus of a direct current (DC) power supply and the output terminal, and a third switching device between a common bus for the AC power supply and the DC power supply and the output terminal. This method comprises, for example, generating driving voltages for the polyphase AC motor by selecting a voltage from among voltages having potential values corresponding to the AC power supply and the DC power supply and using the selected voltage to operate a switch of the plurality of switching devices.

BRIEF DESCRIPTION OF THE DRAWINGS

The description herein makes reference to the accompanying drawings wherein like reference numerals refer to like parts throughout the several views, and wherein:

FIG. 17 is a waveform chart showing a relationship between a DC power supply carrier and an AC power supply carrier in the second embodiment;

FIGS. 18A and 18B are waveform charts showing examples of driving signals that are outputs of the pulse generating portion in the second embodiment wherein FIG. 18A shows a case in which the AC sign signal AC_sign is H, and FIG. 18B shows a case in which the AC sign signal AC_sign is L;

DETAILED DESCRIPTION OF EMBODIMENTS OF THE INVENTION

The known charger previously discussed has a reduced size achieved by using the inverter as part of the charger. However, this can result in a problem such as vibration from the motor during charging since there is a possibility that torque is given to the motor when the motor coil is used as the AC reactor.

In contrast, embodiments of the invention disclosed herein have a reduced size and weight achieved by reducing the number of components but are capable of limiting or avoiding a problem such as vibration due to operation. For example, a power conversion apparatus can supply a polyphase AC motor with driving voltages from among output voltages based on a voltage supplied from an alternating current power supply and a voltage supplied from a direct current power supply. This power conversion apparatus includes a conversion unit corresponding to phases of the polyphase AC motor. The conversion unit in at least one phase includes a switch between a bus of the alternating current power supply and an output terminal, a switch between a bus of the direct current power supply and the output terminal and a switch between a common bus for the alternating current power supply and the direct current power supply and the output terminal. A control device generates the driving voltages for the polyphase AC motor by selecting a voltage from among voltages having potentials corresponding to the alternating current power supply and the direct current power supply. The selected voltage is used to operate one switch.

Accordingly, a polyphase AC motor is supplied with driving voltages from among output voltages based on a voltage supplied from an alternating current power supply and a voltage supplied from a direct current power supply. Thus, even if alternating current power is supplied to the power conversion apparatus, the motor can be controlled. Driving force and vibration unnecessary for the motor can be prevented from being generated.

Figure 1:
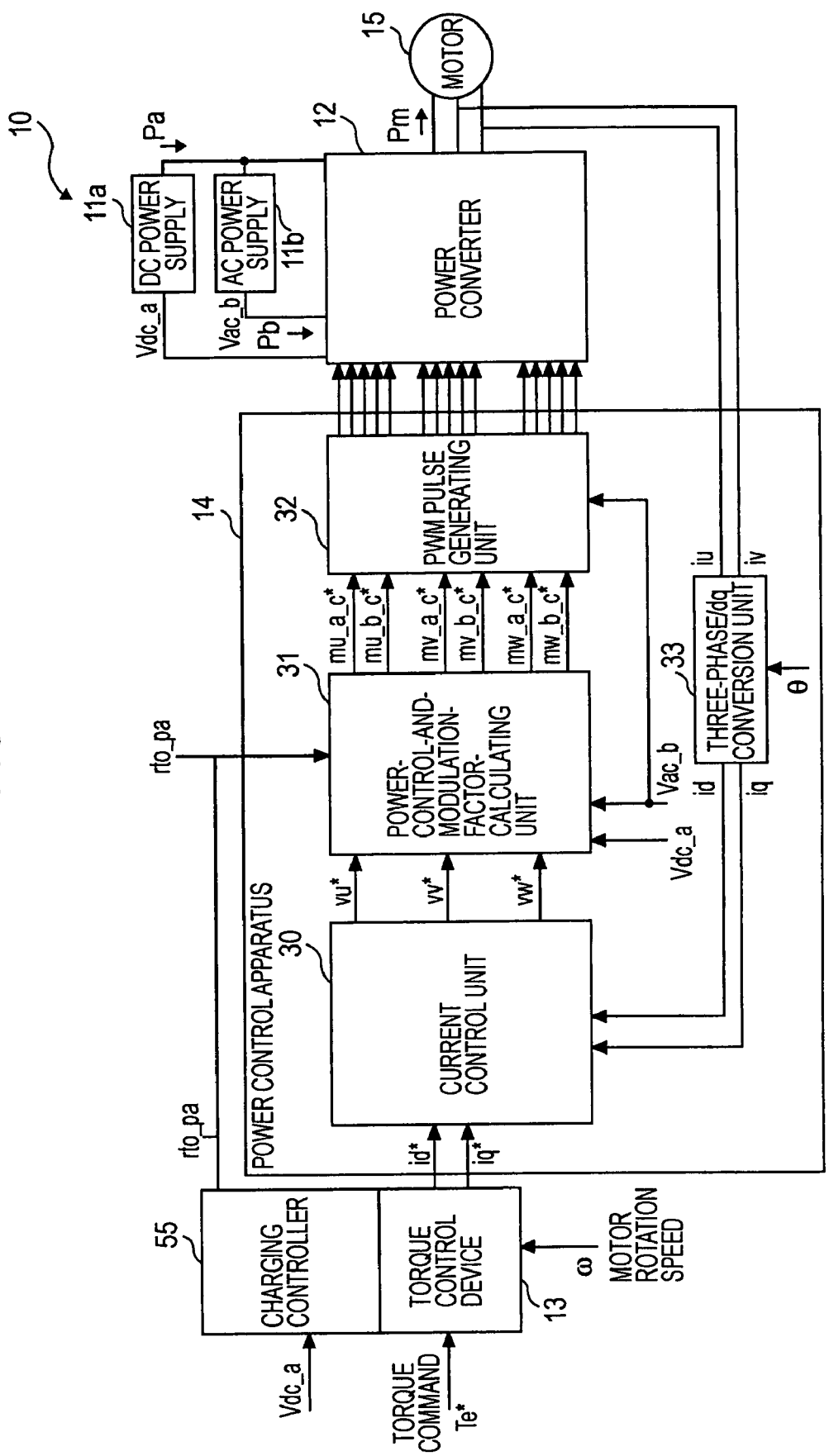
FIG. 1 is a block diagram showing the configuration of a power conversion control system according to a first embodiment of the invention.

Hereinafter there are discussed embodiments of the invention in detail based on the drawings. FIG. 1 is a block diagram showing the configuration of a power conversion control system 10 according to a first embodiment of the invention. As shown in FIG. 1, the power conversion control system 10 includes a DC power supply (internal DC power supply) 11a, an AC power supply (AC power supply source) 11b, a power converter 12 for performing switching functions, a torque control device 13 and a power control apparatus 14. The power converter 12 supplies a necessary voltage to a motor (polyphase AC motor) 15. The motor 15 is a three-phase AC motor receiving power Pm.

Figure 2:
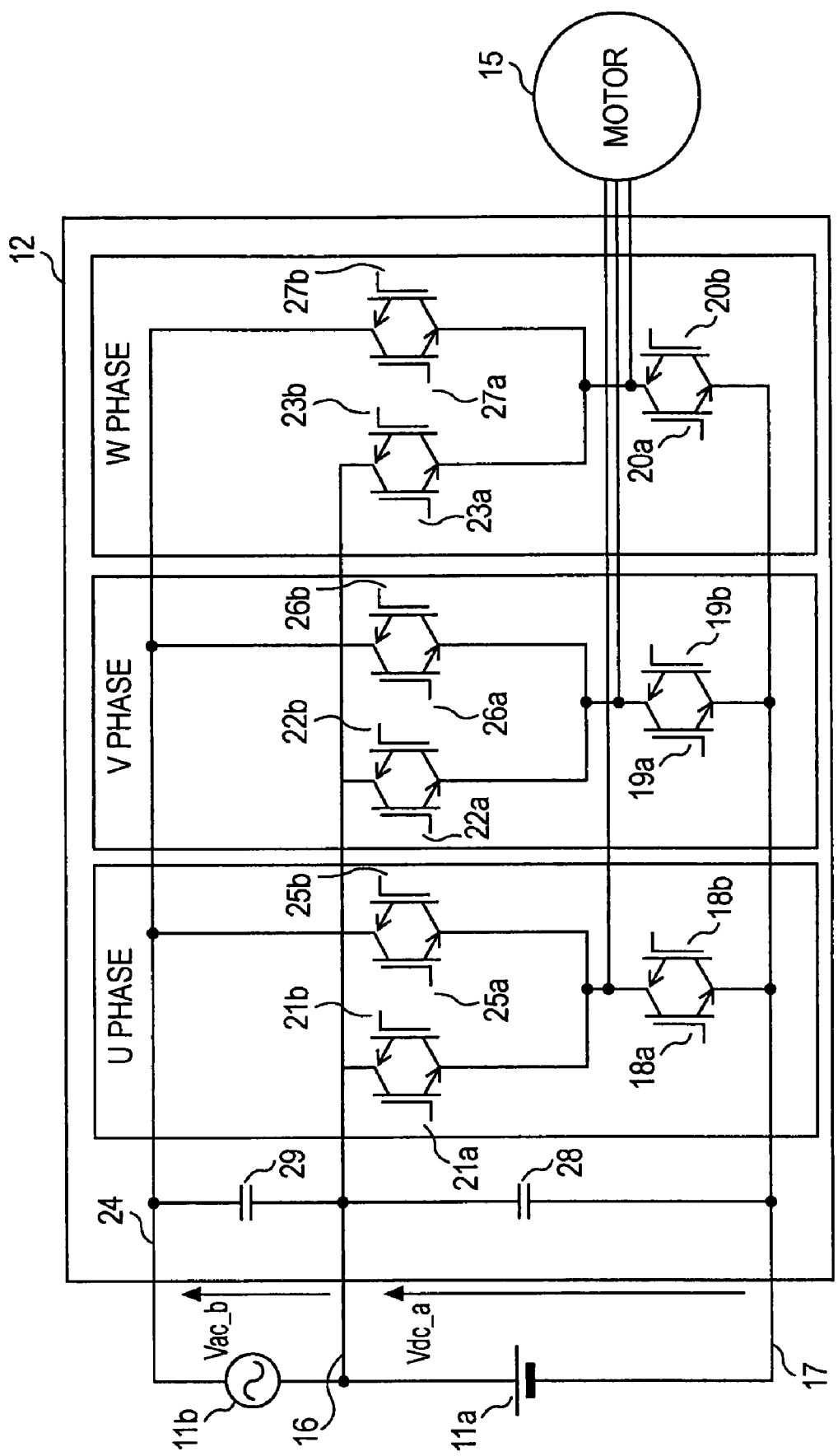
FIG. 2 is a circuit diagram showing the configuration of the power converter 12 as shown in FIG. 1.

FIG. 2 is a circuit diagram of the configuration of the power converter 12 as shown in FIG. 1. As shown in FIG. 2, the power converter 12 includes plural sets of switches for each of the phases (U phase, V phase, W phase) of the motor 15. The DC power supply 11a and the AC power supply 11b are connected to each other in series. A positive electrode of the DC power supply 11a and one terminal of the AC power supply 11b are connected to a common bus 16, which may be hereinafter referred to as a "positive bus." Sets of a negative bus 17 of the DC power supply 11a and each phase terminal of the motor 15 are respectively connected by pairs of semiconductor switches 18a and 18b, 19a and 19b, and 20a and 20b that are capable of controlling bidirectional conduction. Sets of the positive bus 16 and each phase terminal of the motor 15 are respectively connected by pairs of semiconductor switches 21a and 21b, 22a and 22b, and 23a and 23b that are capable of controlling bidirectional conduction. Similarly, sets of a bus 24 to which one terminal of the AC power supply 11b is connected and each phase terminal of the motor 15 are respectively connected by pairs of semiconductor switches 25a and 25b, 26a and 26b, and 27a and 27b that are capable of controlling bidirectional conduction.

A smoothing capacitor 28 is connected between the positive bus 16 and the negative bus 17. A second smoothing capacitor 29 is connected between the bus 24 of the AC power supply 11b and the common bus 16.

The power converter 12 is a DC/AC power converter that generates a voltage to be applied to the motor 15 on the basis of three potential values, that is, the potential of the common bus 16, the potential of the negative bus 17 of the DC power supply 11a and the potential of the bus 24 to which one terminal of the AC power supply 11b is connected. The semiconductor switches provided for each phase of the motor 15 are the switches for generating voltages that are to be output to the phases of the motor 15. By selectively connecting one of the potential values and changing the ratio of a time for the connection, the switches supply the necessary voltage to the motor 15.

As shown in FIG. 1, the torque control device 13 computes direct- (or d-) axial-current command value id* and quadrature- (or q-) axial-current command value iq* on the basis of an externally-given torque command value Te* and detected motor rotational speed ω. The torque control device 13 outputs d-axial-current command value id* and q-axial-current command value iq* by referring to a map created beforehand in which torque command value Te* and motor rotational speed ω are used as axes.

The power control apparatus 14 includes a current control unit 30, a power-control-and-modulation-factor-calculating unit 31, a PWM (pulse width modulation) pulse generating unit 32, and a three-phase/dq conversion unit 33. The power control apparatus, or device, 14 generally comprises a microcomputer including a central processing unit (CPU), input and output ports (I/O), random access memory (RAM), keep alive memory (KAM), a common data bus and read-only memory (ROM) as an electronic storage medium for executable programs and certain stored values as discussed hereinafter. The various units of the power control device 14 could be, for example, implemented in software as the executable programs, or could be implemented in whole or in part by separate hardware in the form of an integrated circuit (IC). The power control apparatus 14 is also called the power controller 14 herein.

The current control unit 30 performs current control for establishing coincidence among d-axial-current command value id* and q-axial-current command value iq* from the torque control device 13, and d-axial current value id and q-axial current value iq detected from the motor 15. The three-phase/dq conversion unit 33 finds d-axial current value id and q-axial current value iq by performing three-phase/dq conversion on U-phase current iu and V-phase current iv that are the present current values of the motor 15 and W-phase current iw obtained from V-phase current iv using phase angle θ. Of course, all three currents could alternately be measured prior to the conversion instead of two as shown.

Figure 3:
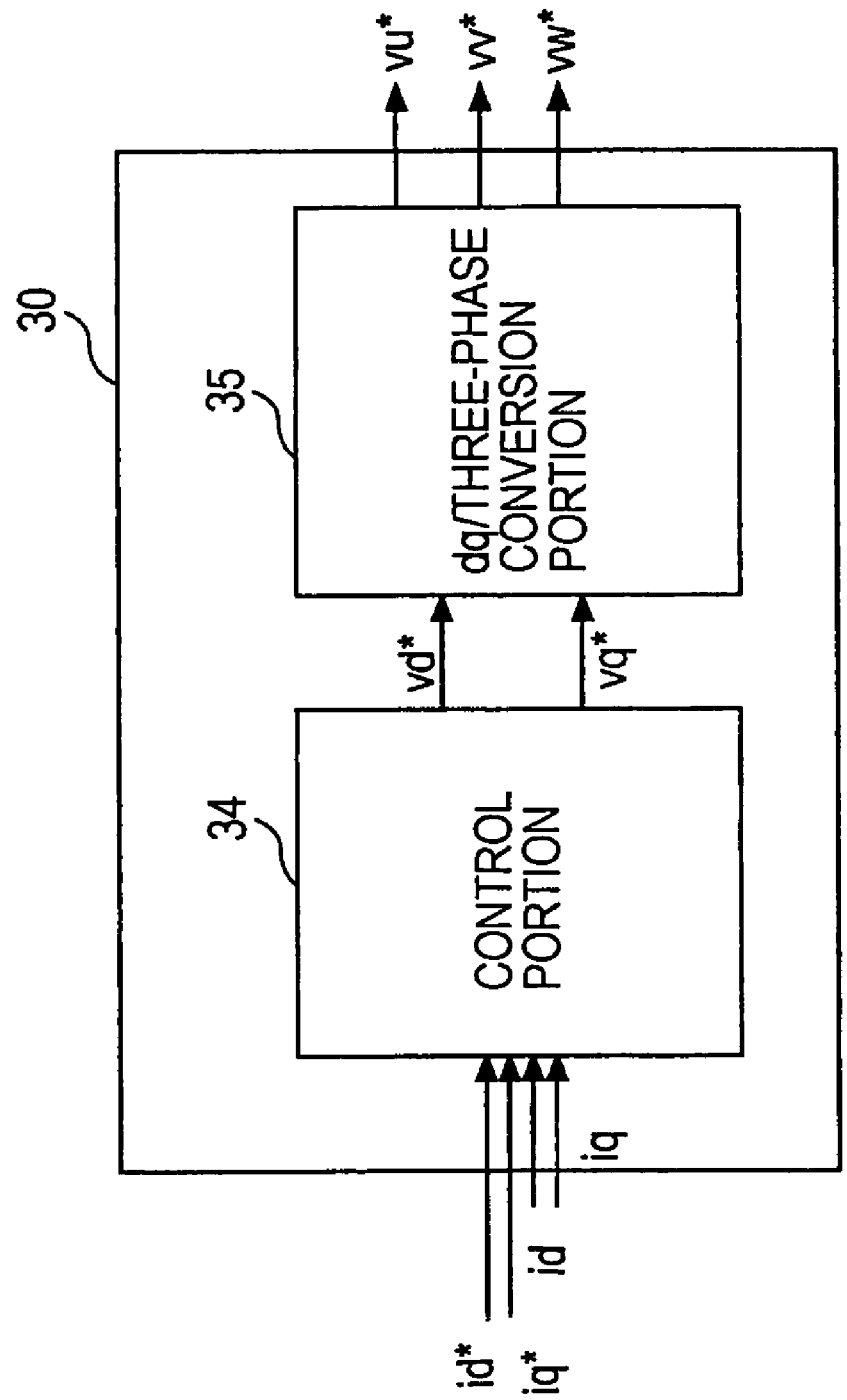
FIG. 3 is a block diagram illustrating the configuration of the current control unit shown in FIG. 1.

FIG. 3 is a block diagram illustrating the configuration of the current control unit 30 shown in FIG. 1. The current control unit 30 includes a control portion 34 and a dq/three-phase conversion portion 35. The control portion 34 outputs d-axial voltage command value vd* and q-axial voltage command value vq* by performing feedback based on P-I (proportional-integration) control so that d-axial current value id and q-axial current value iq can respectively follow d-axial-current command value id* and q-axial-current command value iq*.

The dq/three-phase conversion portion 35 converts a dq-axial voltage into a three-phase voltage command. The dq/three-phase conversion portion 35 receives d-axial voltage command value vd* and q-axial voltage command value vq* as inputs and outputs U-phase voltage command value vu*, V-phase voltage command value vv* and W-phase voltage command value vw*.

Next, referring back to FIG. 1, the power-control-and-modulation-factor-calculating unit 31 controls power by using targeted distribution values rto_pa and rto_pb that are respectively associated with the power Pa from the DC power supply 11a and the power Pb from the AC power supply 11b. The targeted power distribution values represent a power sharing ratio between the DC power supply 11a and the AC power supply 11b, and are externally commanded as desired values. Targeted power distribution values rto_pa and rto_pb have the following relationship:

$$rto\_pa + rto\_pb = 1.$$

Thus, if one targeted power distribution value is obtained, the other targeted power distribution value can be obtained. In other words, it is necessary to input only the targeted power distribution value rto_pa (see FIG. 1) of the DC power supply 11a to the power-control-and-modulation-factor-calculating unit 31. The power-control-and-modulation-factor-calculating unit 31 computes the targeted power distribution value rto_pb of the AC power supply 11b on the basis of the above expression.

Figure 4:
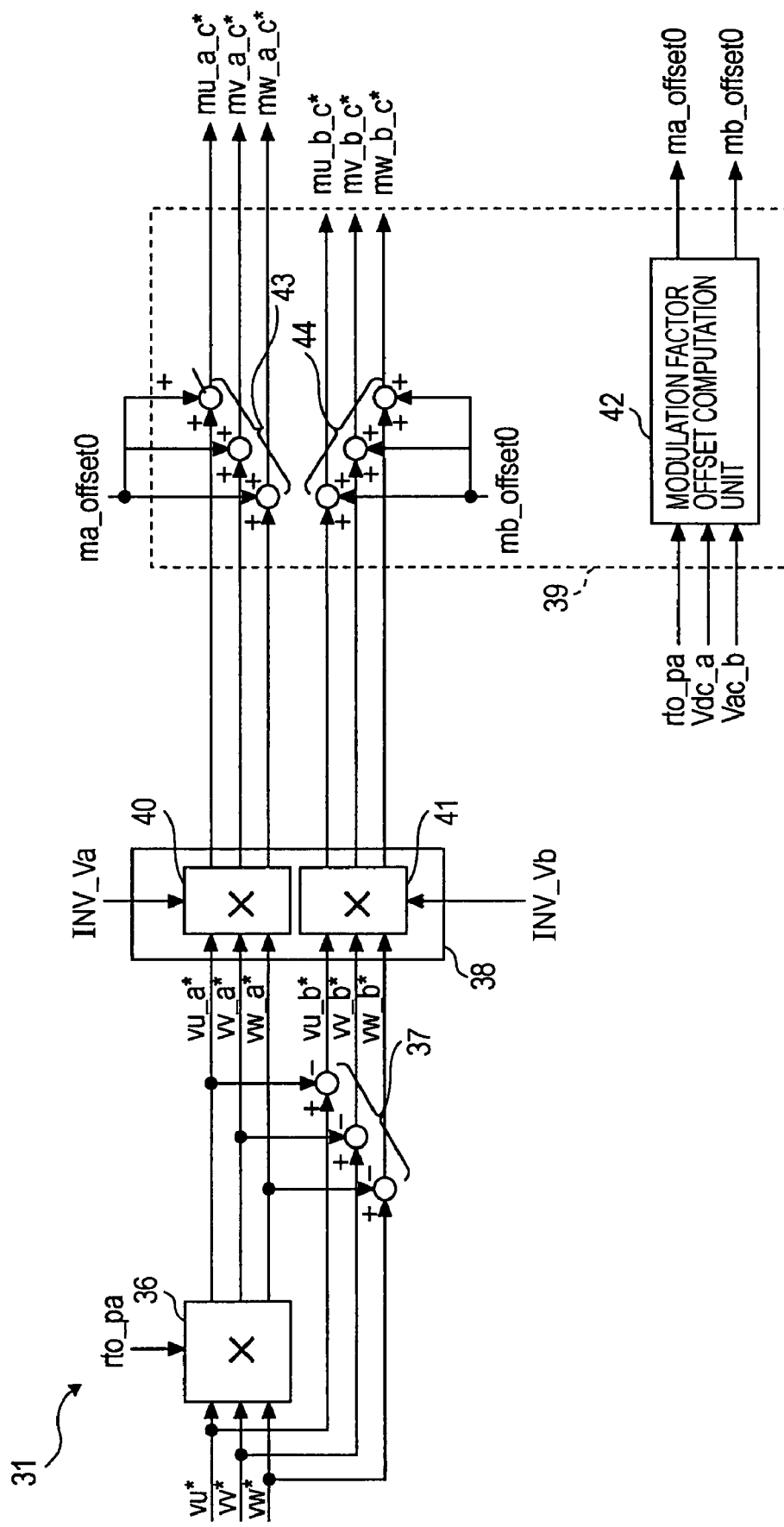
FIG. 4 is a detailed block diagram showing the configuration of the power-control-and-modulation-factor-calculating unit 31 shown in FIG. 1.

FIG. 4 is a detailed block diagram showing the configuration of the power-control-and-modulation-factor-calculating unit 31 shown in FIG. 1. As shown in FIG. 4, the power-control-and-modulation-factor-calculating unit 31 includes a multiplier 36, a subtractor 37, a modulation factor computing portion 38 and a modulation factor correcting portion 39. The multiplier 36 computes voltage command values vu_a*, vv_a* and vw_a* on the side of the DC power supply 11a by multiplying U-phase voltage command value vu*, V-phase voltage command value vv* and W-phase voltage command value vw* by the targeted power distribution value rto_pa of the DC power supply 11a, as shown below:

$$vu\_a^* = vu^* \cdot rto\_pa;$$

$$vv\_a^* = vv^* \cdot rto\_pa; \text{ and}$$

$$vw\_a^* = vw^* \cdot rto\_pa.$$

A voltage command generated from the DC power supply 11a is hereinafter referred to as a "power-supply-a voltage command," and a voltage command generated from the AC power supply 11b is hereinafter referred to as a "power-supply-b voltage command."

In addition, voltage command values vu_b*, vv_b* and vw_b* on the side of the AC power supply 11b are obtained such that the subtractor 37 subtracts the voltage command values vu_a*, vv_a* and vw_a* on the side of the DC power supply 11a from voltage command values vu*, vv* and vw* obtained from a control voltage for motor current control, as shown below:

$$vu\_b^* = vu^* - vu\_a^*;$$

$$vv\_b^* = vv^* - vv\_a^*; \text{ and}$$

$$vw\_b^* = vw^* - vw\_a^*.$$

In the following, modulation factor computation and PWM pulse generation are described concerning only the U phase. However, identical operations are performed for the V phase and the W phase.

The modulation factor computing portion 38 generates normalized voltage commands, that is, instantaneous modulation factor command values mu_a*, mu_b*, mv_a*, mv_b*, mw_a* and mw_b* from voltage Vdc_a of the DC power supply 11a and voltage Vac_b of the AC power supply 11b. In other words, the modulation factor computing portion 38 includes multipliers 40 and 41. The modulation factor computing portion 38 computes power-supply-a instantaneous-modulation-factor command value mu_a* and power-supply-b instantaneous-modulation-factor command value mu_b* by normalizing power-supply-a voltage command vu_a* and power-supply-b voltage command vu_b* of the U phase by half values of the voltages of both commands according to:

$$INV\_Va = 2/Vdc\_a;$$

$$INV\_Vb = -2/Vac\_b;$$

$$mu\_a^* = vu\_a^* \cdot INV\_Va; \text{ and}$$

$$mu\_b^* = vu\_b^* \cdot INV\_Vb.$$

The expression generates INV_Vb by inverting a sign of Vac_b.

Here, the function of generating a distribution ratio command value is performed collectively by the targeted distribution value computation, targeted distribution value generation and targeted distribution value selection functions. The modulation factor computing portion 38 receives the targeted distribution value as an input and performs the function of generating a voltage command value.

The modulation factor correcting portion 39 includes a modulation factor offset computation unit 42 and adders 43 and 44. In order to output the obtained modulation factor, the modulation factor correcting portion 39 allocates time widths of a PWM period and computes a final modulation factor command value.

First, the modulation factor offset computation unit 42 computes next modulation factor offsets (modulation factor correcting values) ma_offset0 and mb_offset0 from power supply voltage Vdc_a of the DC power supply 11a, power supply voltage Vac_b of the AC power supply 11b and targeted distribution value rto_pa of power of the DC power supply 11a where power supply voltage Vac_b of the AC power supply 11b is computed by the above-described expression arranged as follows:

$$rto\_pb = 1 - rto\_pa.$$

Accordingly, $$ma\_offset0 = \frac{\left|\frac{rto\_pa}{Vdc\_a}\right|}{\left|\frac{rto\_pa}{Vdc\_a}\right| + \left|\frac{rto\_pb}{Vac\_b}\right|}; \text{ and}$$

$$\text{ma\_offset0} = \frac{\left|\frac{\text{rto\_pb}}{\text{Vac\_b}}\right|}{\left|\frac{\text{rto\_pa}}{\text{Vdc\_a}}\right| + \left|\frac{\text{rto\_pb}}{\text{Vac\_b}}\right|} \quad 5$$

Next, the computed modulation factor offsets ma_offset0 and mb_offset0 are added to power-supply-a modulation-factor command value mu_a* and power-supply-b modulation-factor command value mu_b*, respectively, by the adders 43 and 44. Final modulation factor command values (modulation factor comparison values) mu_a_c* and mu_b_c* are obtained by the following expressions:

$$mu\_a\_c^* = mu\_a^* + 1 - ma\_offset0; \text{ and}$$

$$mu\_b\_c^* = mu\_b^* + 1 - mb\_offset0.$$

Power is supplied to the motor 15 on the basis of final modulation factor command values mu_a_c* and mu_b_c* and similarly-calculated modulation factor command values mv_a_c*, mv_b_c*, mw_a_c* and mw_b_c* whereby the DC power supply 11a and the AC power supply 11b supply their power in a ratio matching targeted distribution value rto_pa, and the motor 15 is driven on the basis of torque command value Te*. For example, by setting targeted distribution value rto_pa to a negative value and setting torque command value Te* to a value equal to zero, the power of the AC power supply 11b is supplied on the basis of the targeted distribution value to the DC power supply 11a, which is a negative distribution target, so that the motor 15, whose torque command value Te* is equal to zero, is not driven. That is, by setting mu_a_c* and mu_b_c* and the other command values from an appropriate targeted distribution value and a torque command value, the AC power supply 11b can charge the DC power supply 11a.

Referring back to FIG. 1, the PWM pulse generating unit 32 that determines operation of the switches for realizing the computed modulation factor command value, mu_a_c* and mu_b_c* and others is described below. Again, only the U phase is described for simplicity.

Figure 5:
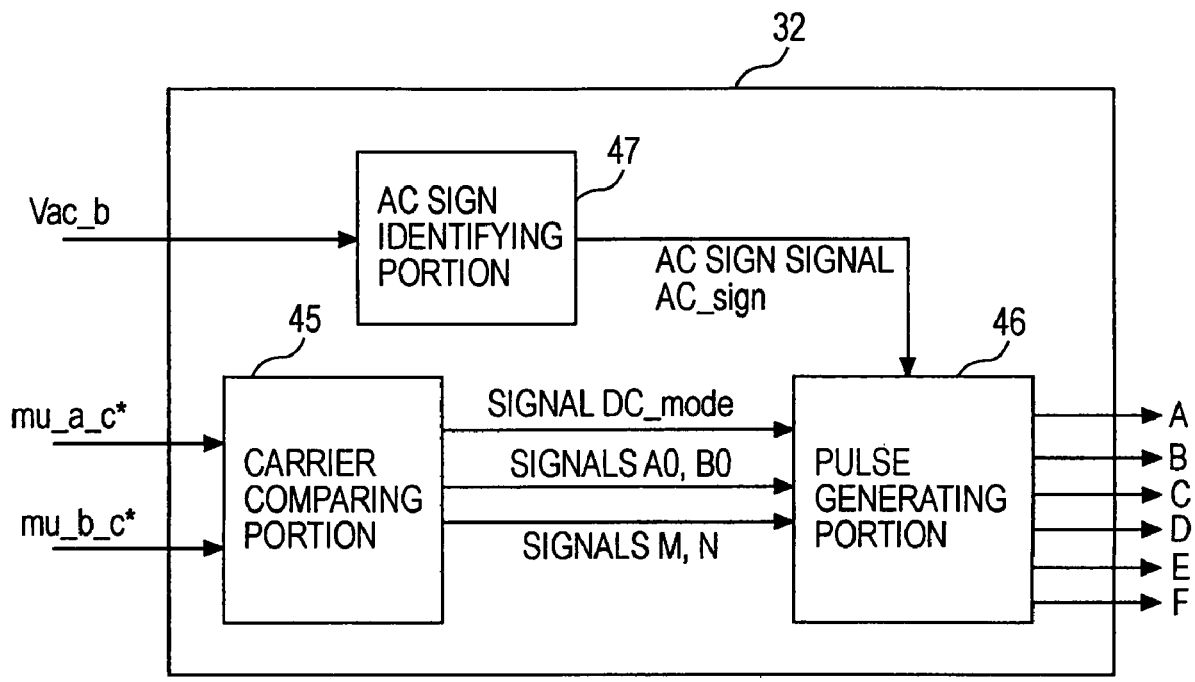
FIG. 5 is a block diagram showing the configuration of the PWM pulse generating unit shown in FIG. 1.

FIG. 5 is a block diagram showing the configuration of the PWM pulse generating unit 32 shown in FIG. 1. As shown in FIG. 5, the PWM pulse generating unit 32 includes a carrier comparing portion 45, a pulse generating portion 46 and an AC sign identifying portion 47. The PWM pulse generating unit 32 generates PWM pulses A-F.

The carrier comparing portion 45 receives modulation factor command values mu_a_c* and mu_b_c* as inputs, compares the inputs with a triangular carrier and outputs pulse signal DC_mode, pulse signals A0 and B0 and pulse signals M and N. The pulse generating portion 46 allocates the pulse signals generated by the carrier comparing portion 45 to the switches.

Figure 6:
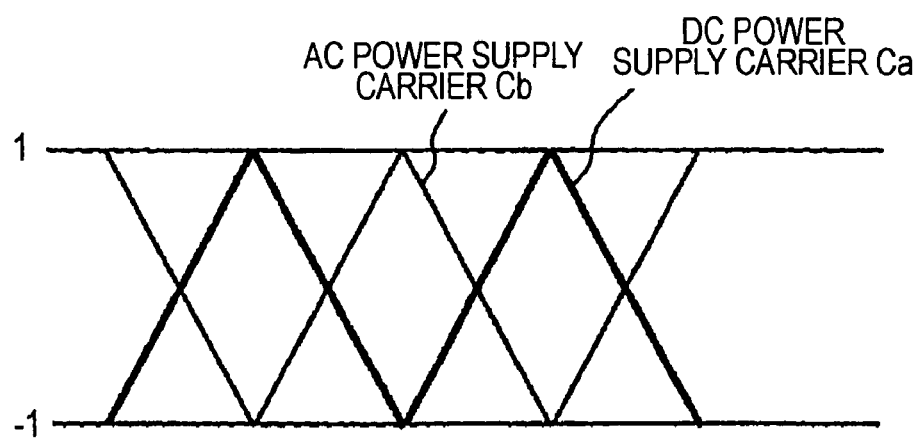
FIG. 6 is a waveform chart of triangular waves for use in the carrier comparing portion shown in FIG. 5.

FIG. 6 is a waveform chart of triangular waves for use in the carrier comparing portion 45 shown in FIG. 5. As shown in FIG. 6, a carrier Ca for the DC power supply 11a is a triangular wave carrier for generating PWM pulses for driving each switch in order to output a voltage pulse from power supply voltage Vdc_a. Similarly, a triangular wave carrier is used as an AC power supply carrier Cb. The triangular wave carriers Ca and Cb each have an upper limit of +1 and a lower limit of −1, and they have a phase difference of 180 degrees.

Figure 7:
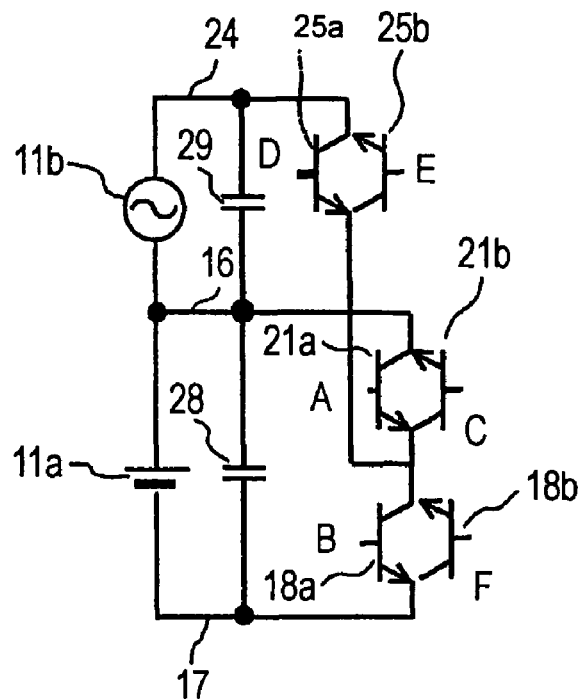
FIG. 7 is a circuit diagram of the U phase shown in FIG. 2.

FIG. 7 is a circuit diagram of the U phase shown in FIG. 2. Signals for driving the switches in the U phase are as follows:

A: a signal for driving switch 21a for establishing conduction in a direction from the common bus 16 to the output terminal;

B: a signal for driving switch 18a for establishing conduction in a direction from the output terminal to the negative terminal 17;

C: a signal for driving switch 21b for establishing conduction in a direction from the output terminal to the common bus 16;

D: a signal for driving switch 25a for establishing conduction in a direction from the AC power supply 11b to the output terminal;

E: a signal for driving switch 25b for establishing conduction from the output terminal to the AC power supply 11b; and F: a signal for driving switch 18b for establishing conduction in a direction from the negative terminal 17 to the output terminal.

When the PWM pulses are output from the DC power supply 11a, it is necessary to set driving signal A to an ON state. At this time, if both driving signals A and B are set to the ON state, an interterminal short-circuit current flows. When the interterminal short-circuit current flows, the amount of heat generated by a semiconductor switch grounded to this path increases. To prevent this increase in generated heat, a time in which both the driving signals A and B are in an OFF state elapses before the driving signals A and B can be switched from the OFF state to the ON state. As described below, pulse generation in which a driving signal is provided with a short-circuit prevention time (dead time) is performed.

Similarly to the case of providing the driving signals A and B with dead times, when there is a potential difference between the common bus 16 and bus 24 of the AC power supply 11b, and the power supply voltage of the AC power supply 11b is represented by Vac_b>0, it is necessary to provide driving signals D and C with dead times. When there is a potential difference between the common bus 16 and bus 24 of the AC power supply 11b, and the power supply voltage of the AC power supply 11b is represented by Vac_b<0, it is necessary to provide driving signals A and E with dead times.

Before actually generating the driving signals, by performing triangular wave comparison and modulation factor comparison, pulse generating signals A0, B0, C0, D0, E0 and F0 are generated from the DC power supply 11a, and pulse generating signals M, N, O, P, Q and R are generated from the AC power supply 11b. The pulse generating portion 46 generates final driving signals by combining the signals A0, B0, C0, D0, E0, F0, M, N, O, P, Q and R.

First, a pulse generating method in the case of outputting voltage pulses from the DC power supply 11a is described below. Signals A0, B0, C0, D0, L0 and F0 respectively correspond to signals A, B, C, D, E and F that are used in the pulse generating portion 46 (described later) to drive switches in the U phase under specific conditions.

Figure 8:
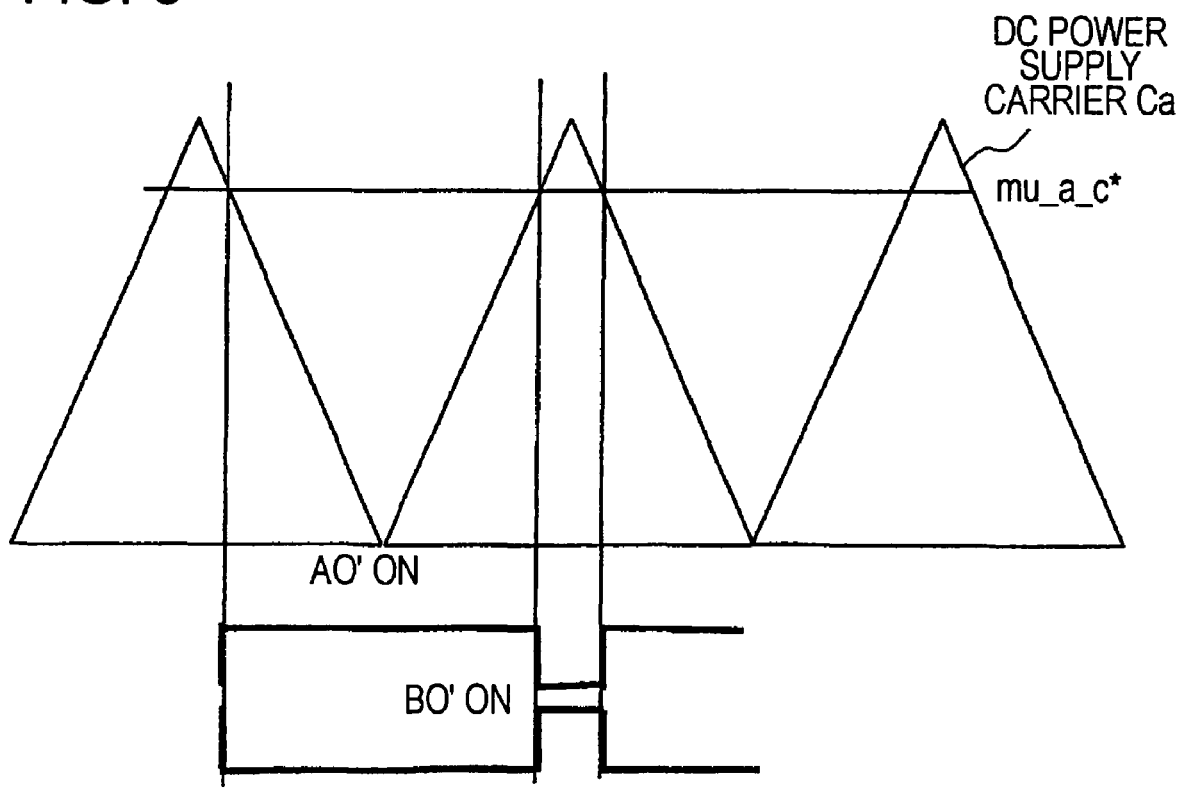
FIG. 8 is a waveform chart illustrating pulse signal generation by triangular wave comparison.
Figure 9:
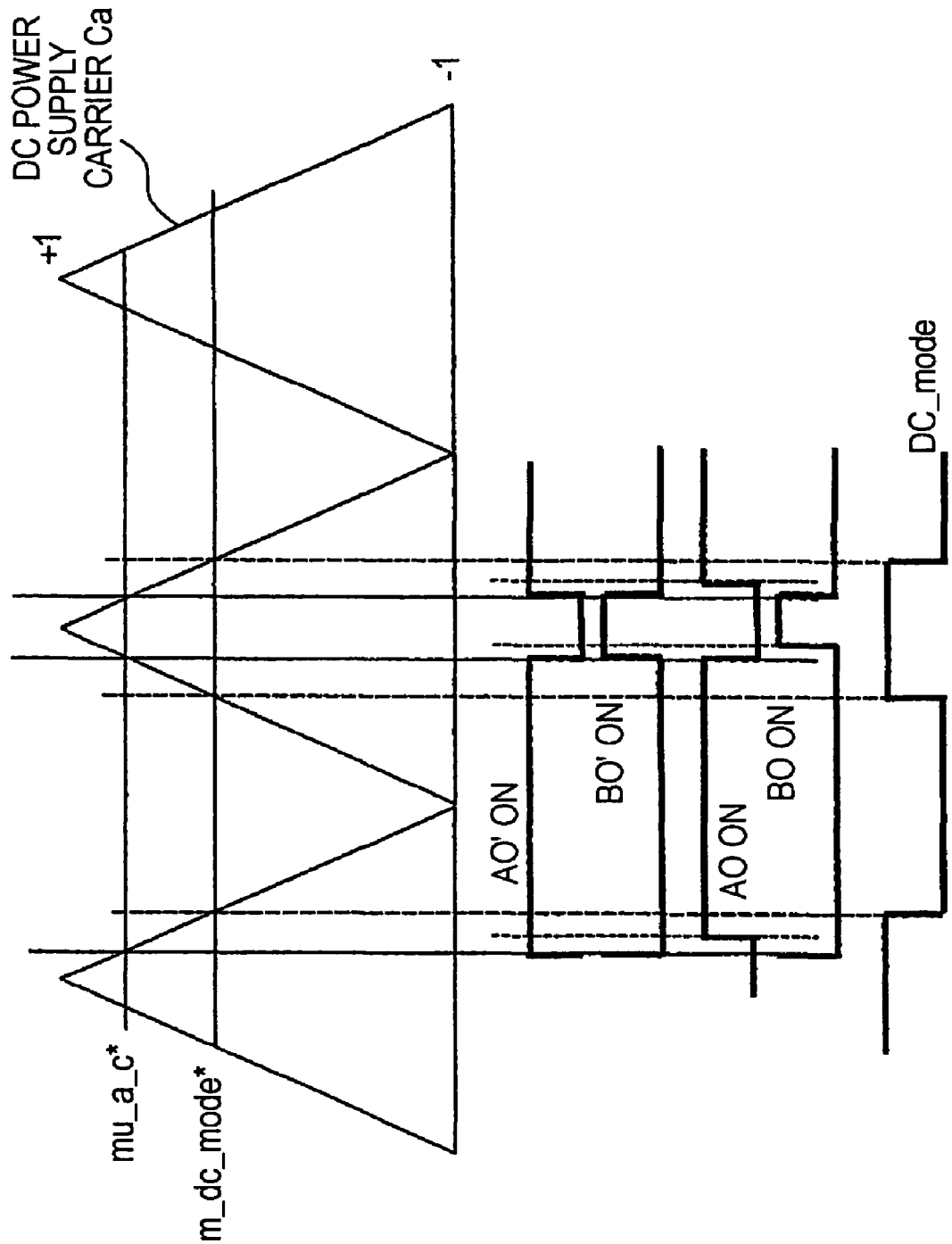
FIG. 9 is a waveform chart illustrating generation of a signal provided with a dead time.

FIG. 8 is a waveform chart illustrating pulse signal generation by triangular wave comparison. FIG. 9 is a waveform chart illustrating generation of a signal provided with a dead time.

As shown in FIG. 8, by comparing the DC power supply carrier Ca and modulation factor command value mu_a_c*, the carrier comparing portion 45 finds signals A0' and B0' in accordance with the following rules:

1) if mu_a_c*>DC power supply carrier Ca, then A0'=on and B0'=off; and 2) if mu_a_c*≦DC power supply carrier Ca, then A0'=off and B0'=on.

Furthermore, as shown in FIG. 9, based on the generated signals A0' and B0', by setting each signal to rise with its rising portion delayed for a dead time (Td), pulse signals A0 and B0 in which both associated switches do not simultaneously enter the ON state are generated. By generating the driving signals as described above, a dead time (Td) provided between driving signals A and B can prevent interterminal short-circuiting.

In addition, simultaneously with generating pulse signals A0' and B0' from the DC power supply carrier Ca, an interval in which the DC power supply 11a is used is generated as a DC_mode signal (shown in FIG. 5). When the DC_mode signal is high (H), power is output from the DC power supply 11a. When the DC_mode signal is low (L), voltage pulses are output from the AC power supply 11b.

Referring to FIG. 9, to generate the DC_mode signal, the following reference signal m_dc_mode* is computed:

$$m\_dc\_mode^* = 1 - 2 \cdot ma\_offset0;\text{ wherein}$$

ma_offset has a value not less than 0 and not greater than 1 and is obtained based on targeted distribution value rto_pa of the power of the DC power supply 11a, power supply voltage Vdc_a of the DC power supply 11a and power supply voltage Vac_b of the AC power supply 11b. This computation sets a time ratio, to all PWM periods, of an interval in which the DC power supply 11a is used.

By comparing the computed reference signal (or selection signal) m_dc_mode* and the DC power supply carrier Ca, the DC_mode signal is generated as follows:

1) if m_dc_mode*>DC power supply carrier Ca, then DC_mode=off; and
2) if m_dc_mode*≦DC power supply carrier Ca, then DC_mode=on.

Other signals C0, D0, E0, and F0 are determined as follows:

C0=on;
D0=off;
E0=off; and
F0=on.

These combinations of ON and OFF states of the switches are equivalent to a case in which, by using a set of switches, such as power converter 12, connected to the bus of the DC power supply 11a, a circuit configuration similar to a common three-phase inverter circuit is realized. The above signals are determined as described above so that signals C0 and F0, which correspond to return direction switches, can be set to be ON. In addition, signals D0 and E0 of switches connected to only the bus of the AC power supply 11b are set to be OFF. For brevity of description, in the above, the signals C0, D0, E0 and F0 are generated by the carrier comparing portion 45. Actually, they are generated by the pulse generating portion 46 described later.

Next, a pulse generating method in the case of outputting voltage pulses from the AC power supply 11b is described below. Signals M, N, 0, P, Q and R respectively correspond to signals A, B, C, D, E and F that are used in the pulse generating portion 46 to drive switches in the U phase. Similarly to the case of the DC power supply 11a, by comparing the AC power supply carrier Cb and modulation factor command value mu_b_c* the pulse generating portion 46 finds signals M' and N' in accordance with the following rules:

1) if mu_b_c*> AC power supply carrier Cb, then M'= on and N'= off; and
2) if mu_b_c* AC power supply carrier Cb, then M'= off and N'= on.

Figure 10:
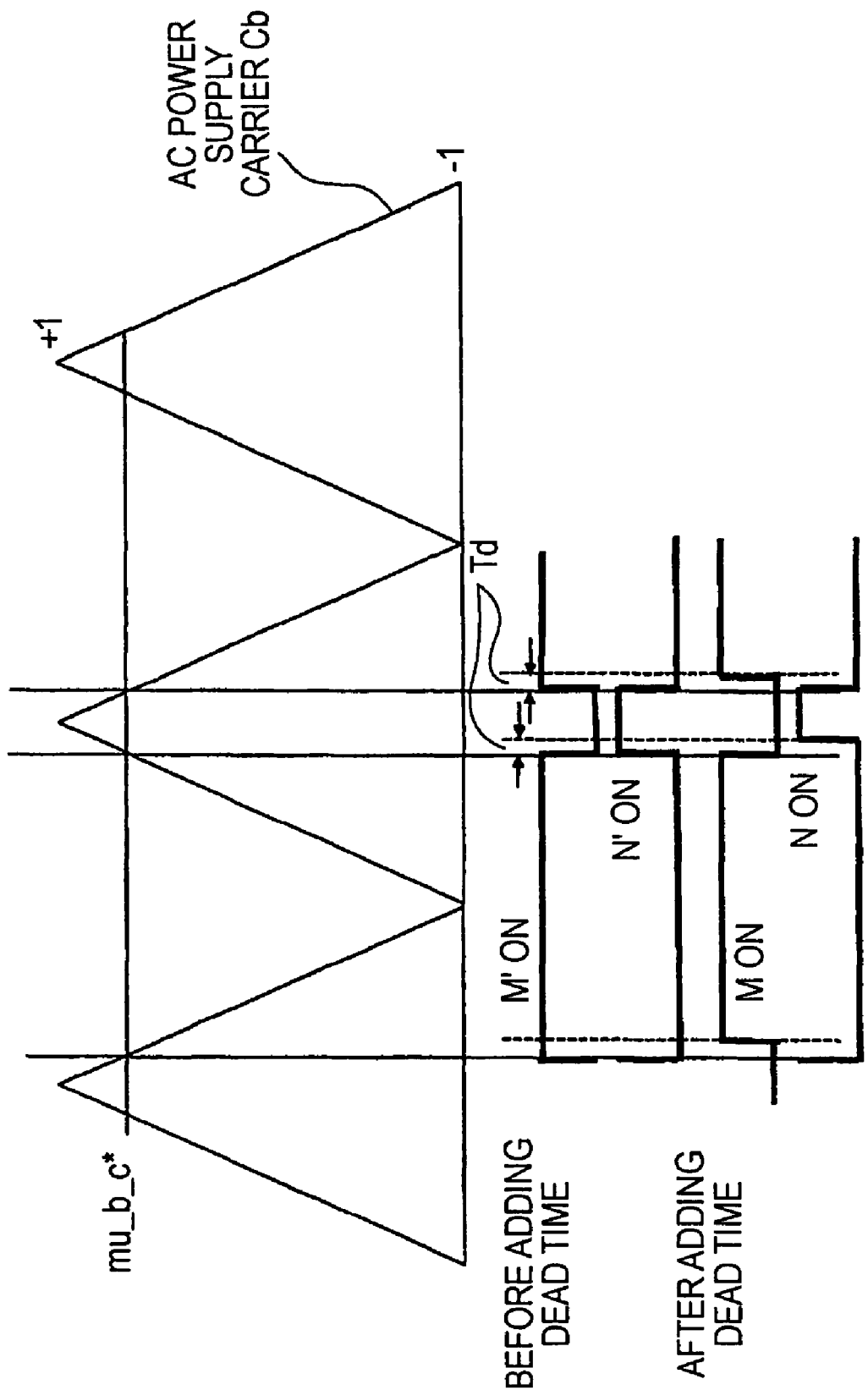
FIG. 10 is a waveform chart illustrating pulse signals M and N.

FIG. 10 is a waveform chart illustrating pulse signals M and N. As shown in FIG. 10, on the basis of the generated signals M' and N', pulse signals M and N in which delay's (Td) are provided in rising portions of the signals are generated.

In addition, other signals O, P, Q and R are determined as follows:

O=on;
P=on;
Q=off; and
R=off.

On the basis of the obtained signals M, N, O, P, Q and R, by using the power converter 12 connected to the bus of the AC power supply 11b, a switch in the return direction is to be ON so that the switch can operate as an inverter, and a signal for a switch for performing PWM is generated. For brevity of description, in the above, the signals O, P, Q and R are generated by the carrier comparing portion 45. Actually they are generated by the pulse generating portion 46 described later. In this case, by allowing changing of switches to be assigned depending on the polarity of the AC power supply 11b, these signals facilitate PWM pulse generation and reservation of a current path.

The AC sign identifying portion 47 shown in FIG. 5 receives voltage Vac_b of the AC power supply 11b as an input, identifies the sign of the input voltage and outputs an AC sign signal AC_sign. The AC_sign is H when the AC voltage is positive and is L when the AC voltage is negative.

Based on the signals A0, B0, DC_mode, M and N obtained by the carrier comparing portion 45, and the AC sign signal AC_sign obtained by the AC sign identifying portion 47, the pulse generating portion 46 generates final driving signals for the switches by performing the following computations:

$$A = A0 \cdot DC\_mode + (AC\_sign + M \cdot \overline{AC\_sign}) \cdot \overline{DC\_mode}$$

$$B = B0 \cdot DC\_mode$$

$$C = DC\_mode + (M \cdot AC\_sign + \overline{AC\_sign}) \cdot \overline{DC\_mode}$$

$$D = (N \cdot AC\_sign + \overline{AC\_sign}) \cdot \overline{DC\_mode}$$

$$E = (AC\_sign + N \cdot \overline{AC\_sign}) \cdot \overline{DC\_mode}$$

$$F = DC\_mode$$

The above expression assigns signal N·AC_sign(+) to expression D, assigns signal M·AC_sign(+) to expression C, assigns signal N·AC_sign(−) to expression E and assigns signal M·AC_sign(−) to expression A. This operation formulated by these expressions is prepared so as to consider the inverted sign of Vac_b, which is computed in the modulation factor computing portion 38.

The above expressions are briefly described as follows. For example, in the expression for A, the left term represents the operation of the switch A when DC_mode is H. The switch A operates on the basis of the signal A0 generated by the carrier comparing portion 45. Alternatively, when DC_mode is L, the switch A is in the ON state when AC_sign is H on the basis of the right term. When AC_sign is L, the switch A operates on the basis of the signal M generated by the carrier comparing portion 45. That is, based on the H or L state of the pulse signal DC_mode, and the H or L state of the signal AC_sign when DC_mode is L, a final operation of the switch A is determined.

The signals C0, D0, E0, F0, O, P, Q and R are signals whose ON and OFF states are determined based on the H and L states of pulse signal DC_mode. Accordingly, these signals are not represented by the above expressions. In FIG. 5, these signals are not shown, as described above, so that these signals do not need to be output from the carrier comparing portion 45 to the pulse generating portion 46.

The driving signals (for the switches) generated as described above are described below paying attention to an interval in which the DC_mode signal is L.

Figure 11:
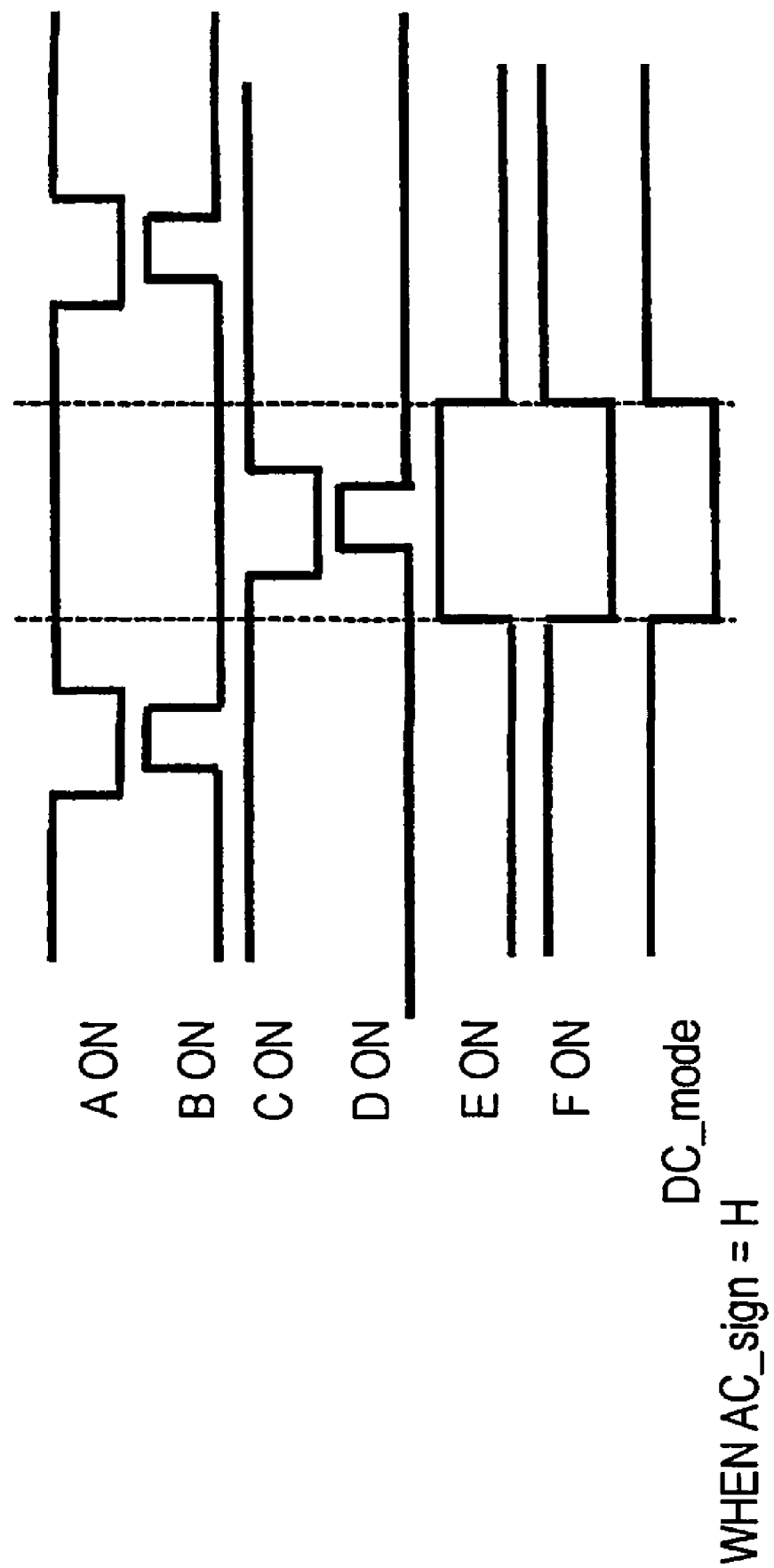
FIG. 11 is a waveform chart showing examples of switch driving signals obtained when the AC sign signal AC_sign is H.
Figure 12:
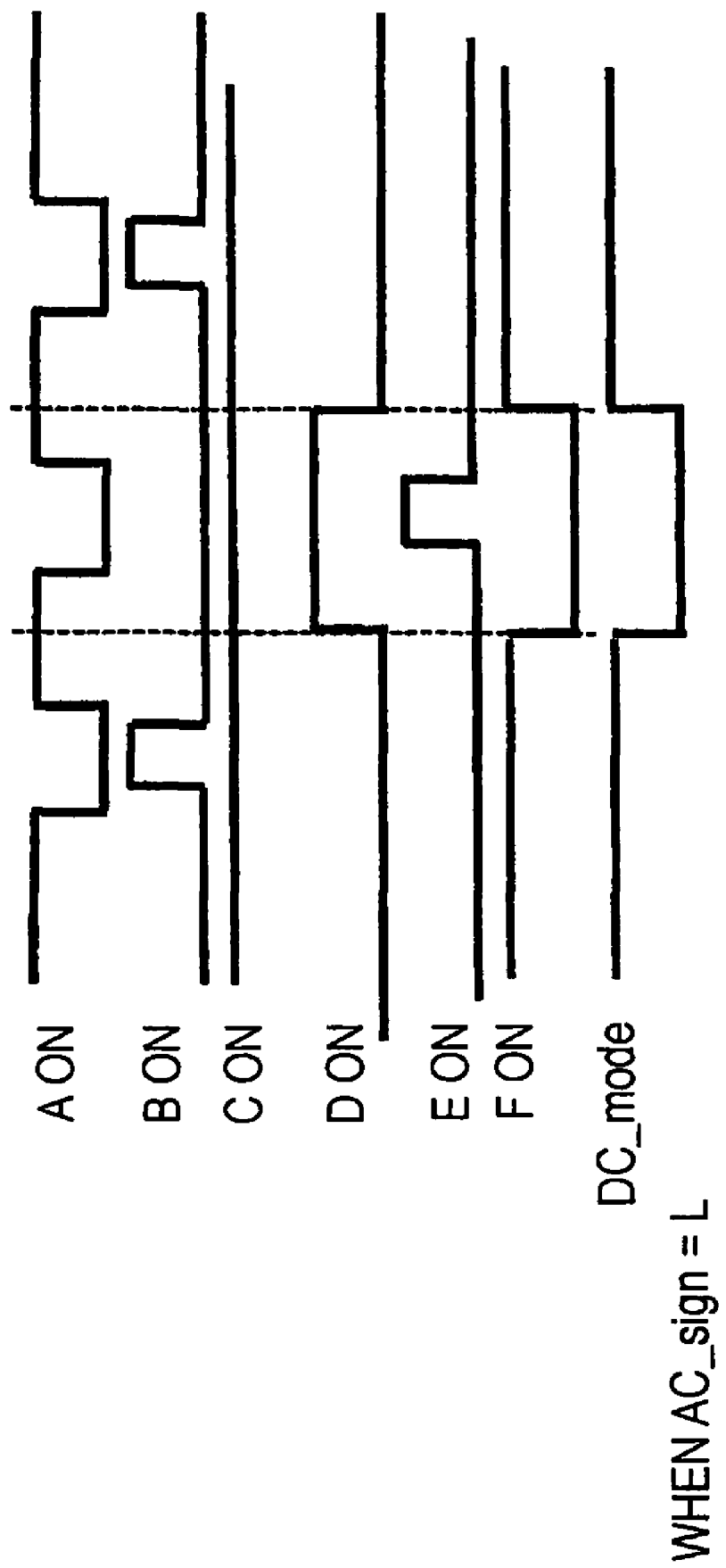
FIG. 12 is a waveform chart showing examples of switch driving signals when the AC sign signal AC_sign is L.

FIG. 11 is a waveform chart showing examples of switch driving signals obtained when the signal AC_sign is H. FIG. 12 is a waveform chart showing examples of switch driving signals when the signal AC_sign is L.

Specifically, FIG. 11 shows examples of driving signals obtained when the AC sign signal AC_sign is H, that is, when the voltage of the AC power supply 11b is positive. In an interval in which the DC_mode signal is L, the driving signal E for the switch on a path from the output terminal in the U phase to the bus 24 of the AC power supply 11b is set to be H, that is, the ON state, and the driving signal A for the switch on a path from the common bus 16 to the output terminal in the U phase is set to the ON state. This combination sets a return path of an inverter including the AC power supply 11b to be in the ON state. Thus, the return path is prevented from disappearing.

In addition, FIG. 12 shows examples of driving signals obtained when the AC sign signal AC_sign is L, that is, when the voltage of the AC power supply 11b is negative. In an interval in which the DC_mode signal is H, the driving signal C for the switch on a path from the output terminal in the U phase to the common bus 16 is set to be H, that is, the ON state, and the driving signal D for the switch on a path from the bus 24 on the side of the AC power supply 11b to the output terminal in the U phase is set to the ON state. In this manner, the switches are set to be ON whereby a return current path does not disappear even in the interval in which voltage pulses are output from the AC power supply 11b.

In other words, the signal AC_sign is used to allow the inverter to operate as a rectifier, and reservation of the return path by sign inversion is simultaneously performed.

In a case in which the driving signal E for the switch is allowed to be in the ON state when the DC_mode signal is H, even if the DC_mode signal is switched, the return path can be reserved anytime irrespective of a DC mode, an AC mode and a modulation factor command.

In addition in an interval in which the DC power supply is used and an interval in which the AC power supply is used, a pulse signal for each switch can be consecutively generated.

Figure 13:
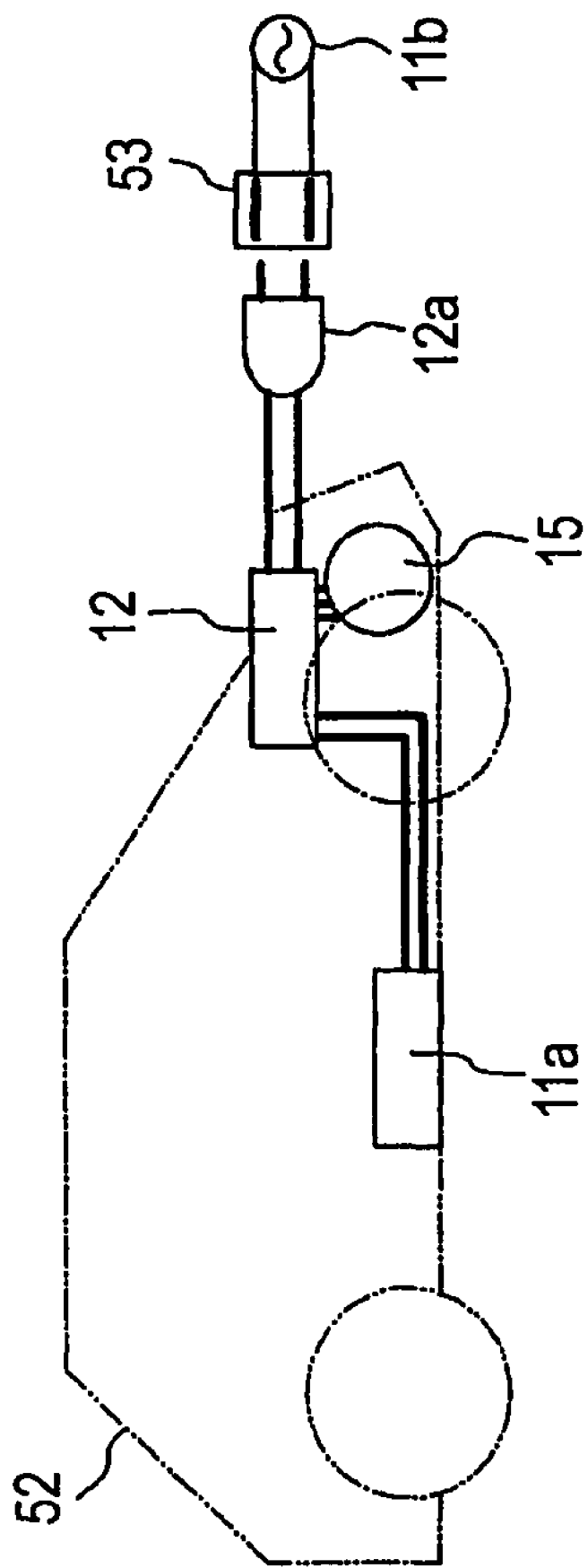
FIG. 13 is a schematic illustration of an electric automobile provided with a power conversion apparatus.

Next, a charging operation by using an embodiment of the power conversion apparatus is described below. FIG. 13 is a schematic illustration of an electric automobile 52 provided with a power conversion apparatus of the invention. As shown in FIG. 13, the electric automobile 52 includes, for example, the above-described power converter 12, the DC power supply 11a and the motor 15. The DC power supply 11a in the electric automobile 52 is a storage battery capable of charging and discharging. An AC power supply input portion 12a of the power converter 12 is plug-shaped. By connecting the AC power supply input portion 12a to an AC power supply terminal 53 (outlet) of the AC power supply 11b a circuit is formed with the AC power supply 11b used as a power supply for the power converter 12.

In the electric automobile 52, instead of the torque control device 13 of the power conversion control system 10, the charging controller 55 is used as shown in FIG. 1. Other components and operation are similar to those of the power conversion control system 10.

The charging controller 55 generates current command values id* and iq* to the motor 15 and generates targeted distribution value rto_pa of power supplied from the DC power supply 11a. Regarding input of a current command value to the power converter 12, a command value is given to id* from which no motor torque is generated, and a current for motor torque iq* is set to zero (iq*=0). This can supply power to the motor 15 even if the electric automobile 52 is in a halted state.

When the power of the AC power supply 11b is set to be positive, and the power of the DC power supply 11a is set to be negative, that is, when the power is supplied from the AC power supply 11b to the motor 15, and the DC power supply 11a is charged by the motor 15, targeted distribution value rto_pa is set to a negative value. Also, targeted distribution value rto_pb of the power supplied from the AC power supply 11b is set to be greater than one (rto_pb>1). This allows the AC power supply 11b operate so as to supply power to the motor 15 and so that power stored in an inductor of the motor 15 can next charge the DC power supply 11a.

The charging controller 55 receives voltage Vdc_a of the DC power supply 11a as an input and compares this voltage value and a target voltage value for charging. When the actual voltage value exceeds the target value, charging control is stopped by setting current command value id* to the motor 15 to zero (id*=0).

Advantages of this embodiment are as follows.

Since the power converter 12 generates an output voltage by using a plurality of power supplies including DC and AC power supplies to generate and combine pulses, combination and distribution of power from the power supplies can be performed by operating the output pulses without using a device such as a transformer or converter. This can reduce the size and weight of the power converter 12.

In addition, the PWM pulse generator generates the DC voltage command value and the AC voltage command value from a motor current command value dependent on a motor torque command value, a distribution ratio command value representing targeted distribution of power of the AC power supply and power of the DC power supply, and output voltage values of the AC power supply and the DC power supply. Therefore, by generating the ON/OFF signal for each switch on the basis of an output voltage command value of the power converter 12, an output voltage value of the AC power supply 11b and an output voltage value of the DC power supply 11a, an output voltage can be realized from the output voltage command value and the voltage values of the power supplies, even if the power supply voltages vary.

In addition, the PWM pulse generator generates a modulation factor comparison value from the modulation factor command value and a modulation factor correcting value added to the modulation factor command value and generates a PWM ON/OFF signal by comparing the modulation factor comparison value and a carrier signal. Therefore, even in the case of selective output in an arbitrary ratio from the DC power supply and the AC power supply, a commanded output voltage can be realized by using the modulation factor correcting value to correct the modulation factor signal and modifying the PWM ON/OFF signal without changing the carrier signal.

When an output interval of the DC power supply and the AC power supply is selected for output, a carrier and a modulation factor are compared only in the interval. Thus, the carrier is set within the period, and the modulation factor, which is subject to comparison, can be more easily changed compared with changing the amplitude and phase of the carrier. In particular, when the carrier is generated in a counter by using a microcomputer or the like, compared with clearing the counter in the middle of generation and changing an upper limit of the count, register data, which is subject to comparison, can be more easily changed.

In addition, the PWM pulse generator generates the modulation factor command value from the voltage command value corresponding to the AC power supply and a value obtained by inverting a sign of a voltage value of the AC power supply. The PWM pulse generator generates voltage pulses of the AC power supply and the DC power supply so that both voltage pulses are set to be in the center of each of different 180° phase carrier. Moreover, signal N*AC_sign(+) is assigned to expression D, signal M*AC_sign(+) is assigned to expression C, signal N*AC_sign(−) is assigned to expression E, and signal M*AC_sign(−) is assigned to expression A. Therefore, when AC_sign is L, the voltages pulses are output symmetrically in a time-based direction by forming the voltage pulses in the center of the carrier period. The voltage pulses from the DC power supply and the AC power supply have time intervals wherein the DC power supply and the AC power supply can be switched in a state with the output voltage at low potential. This facilitates PWM generation of switches, which can be inexpensively realized. Moreover when AC sign is L, in an interval in which the DC power supply is used and an interval in which the AC power supply is used, a pulse signal for each switch can be consecutively generated. The relation of the switch corresponding to AC power can be reversed, and the AC voltage pulse is output symmetrically in a time-based direction by forming the voltage pulse in the carrier period. This can reduce the number of times switching is performed at power supply switching timing, thus reducing a loss of the power conversion apparatus.

In addition, the PWM pulse generator generates PWM pulses for certain switches by comparing the modulation factor comparison value and the carrier signal, and generates the ON or OFF signal for the other switches by comparing the AC-sign and DC-mode. Therefore, generation of the PWM pulses can be simplified by outputting the signal in either ON or OFF state without generating PWM pulses for all the switches. This can further reduce an apparatus cost. Among inter-terminal switches, switches that are set to be always on or off during an output period of the DC power supply or an output period of the AC power supply are provided, whereby the number of times switching is performed can be reduced, thus suppressing a switching loss.

In addition, a switch corresponding to a diode on a return path in a common inverter and a switch of a power converter that corresponds to a switch in the inverter depending on the positive and negative signs of the AC voltage are allocated. Therefore, a return path for output current can be secured, and by selectively allocating a signal, PWM pulses for the switch can be easily generated.

If the return current path is interrupted, then rapid changes in the inductance component and current apply high voltages to switch devices. Thus, the switch devices have withstand voltage capabilities for the voltage application. By securing the return path, the withstand capabilities of the switch devices can be lowered without causing the above rapid change in current.

In addition, an automobile according to embodiments of the invention includes an electric motor and a power conversion apparatus in accordance with that described herein. The automobile travels by using the power conversion apparatus to drive the electric motor. Therefore, charging and discharging of a power supply included in the automobile, charging from an AC power supply and discharging thereto can be operated. It is not necessary to provide the automobile with devices (components) such as a new charger, an AC reactor and switch means. By enabling a power operation with the power conversion apparatus including switches, the entire apparatus has reduced size and weight compared with those using a reactor and mechanical switch means. Large automobile interior space can be obtained.

In addition, when power is output from one of the AC power supply and the DC power supply, a positive value as a distribution ratio command value is set corresponding to the AC power supply or the DC power supply for supplying the power. When the DC power supply is charged, a negative ratio is set as a distribution ratio command value corresponding to the DC power supply. Therefore, when power is output from a power supply, a positive ratio is set as a distribution ratio command value corresponding to the power supply, and, when a power is charged, a negative ratio is set as a distribution ratio command value corresponding to the power supply. Accordingly, a power supply power operation can be performed, and the power supply can be charged by operating output pulses of the power conversion apparatus without using a charger.

In addition, the first embodiment supplies the motor connected to the output terminal with a current based on which no torque is generated and generates a distribution ratio representing a ratio of distribution of an output voltage command value to the AC power supply and the DC power supply. It sets a positive ratio as a distribution ratio command value corresponding to the AC power supply or the DC power supply for supplying power when the power is output from one of the AC power supply and the DC power supply, and it sets a negative ratio as a distribution ratio command value corresponding to the DC power supply when the DC power supply is charged. Therefore, by supplying an electric motor with a current based on which no torque is generated, even in a state with the motor in a halt, charging and discharging of a plurality of power supplies can be operated without generating unnecessary torque. In a case in which the motor is to be stopped when torque is generated, a mechanical braking device is needed. However, it is not necessary to provide or operate the braking device since charging and discharging are possible without generating torque.

When the power conversion apparatus is realized by using a computational device such as a microcomputer, the control operations described can be realized by software.

Figure 14:
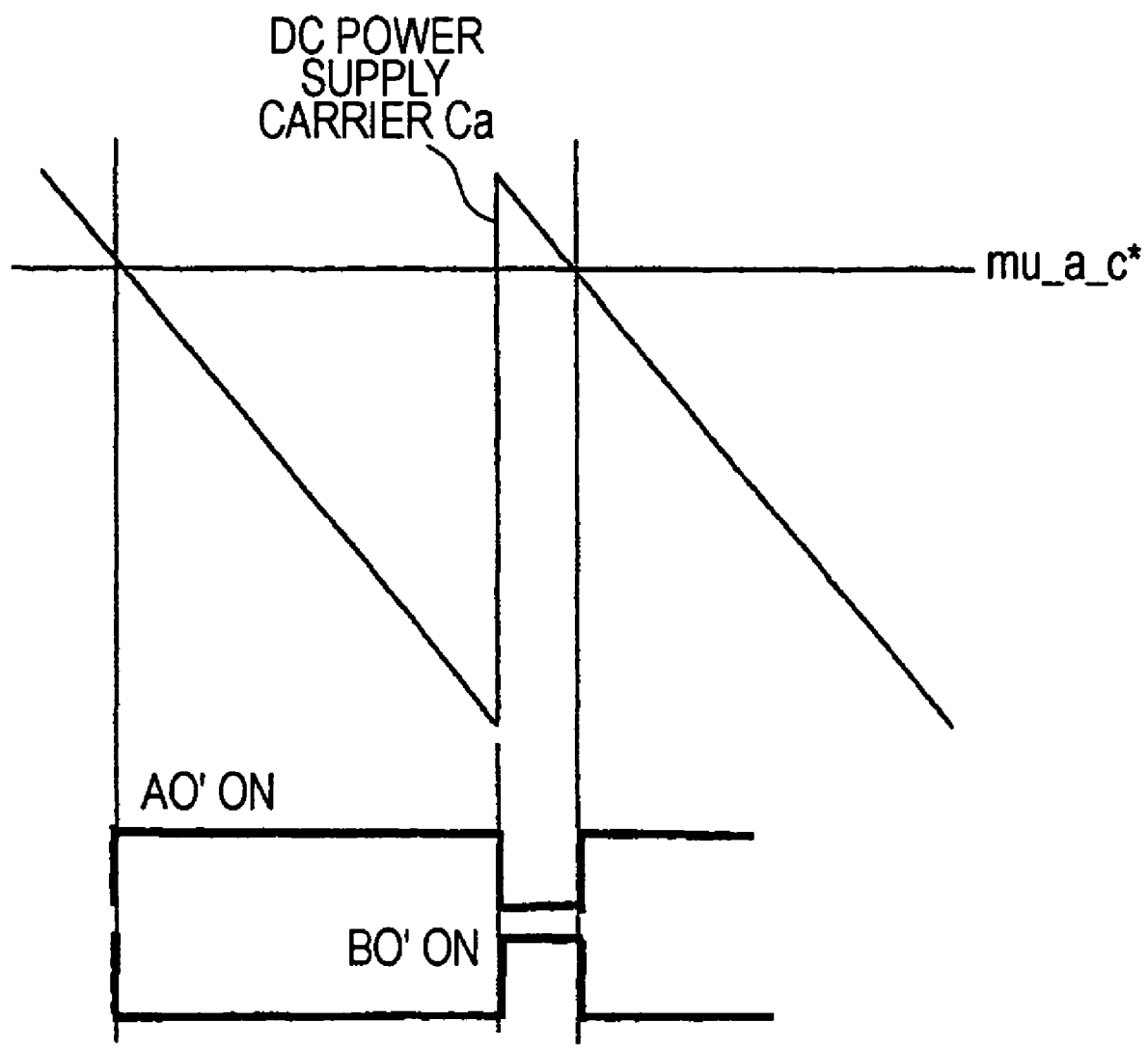
FIG. 14 is a waveform chart showing generation of pulses of signals A0' and B0' by sawtooth wave comparison in a second embodiment.

FIG. 14 is a waveform chart showing generation of pulses of signals A0' and B0' by sawtooth wave comparison in the second embodiment. As shown in FIG. 14, the pulses of signals A0' and B0' are generated by comparing a sawtooth carrier (DC power supply carrier Ca) and modulation factor command value mu_a_c*. In this case, the generation is performed in accordance with rules similar to those used in the first embodiment. Also for the signals A0' and B0', signals A0 and B0 provided with dead times (Td) are generated.

Figure 15:
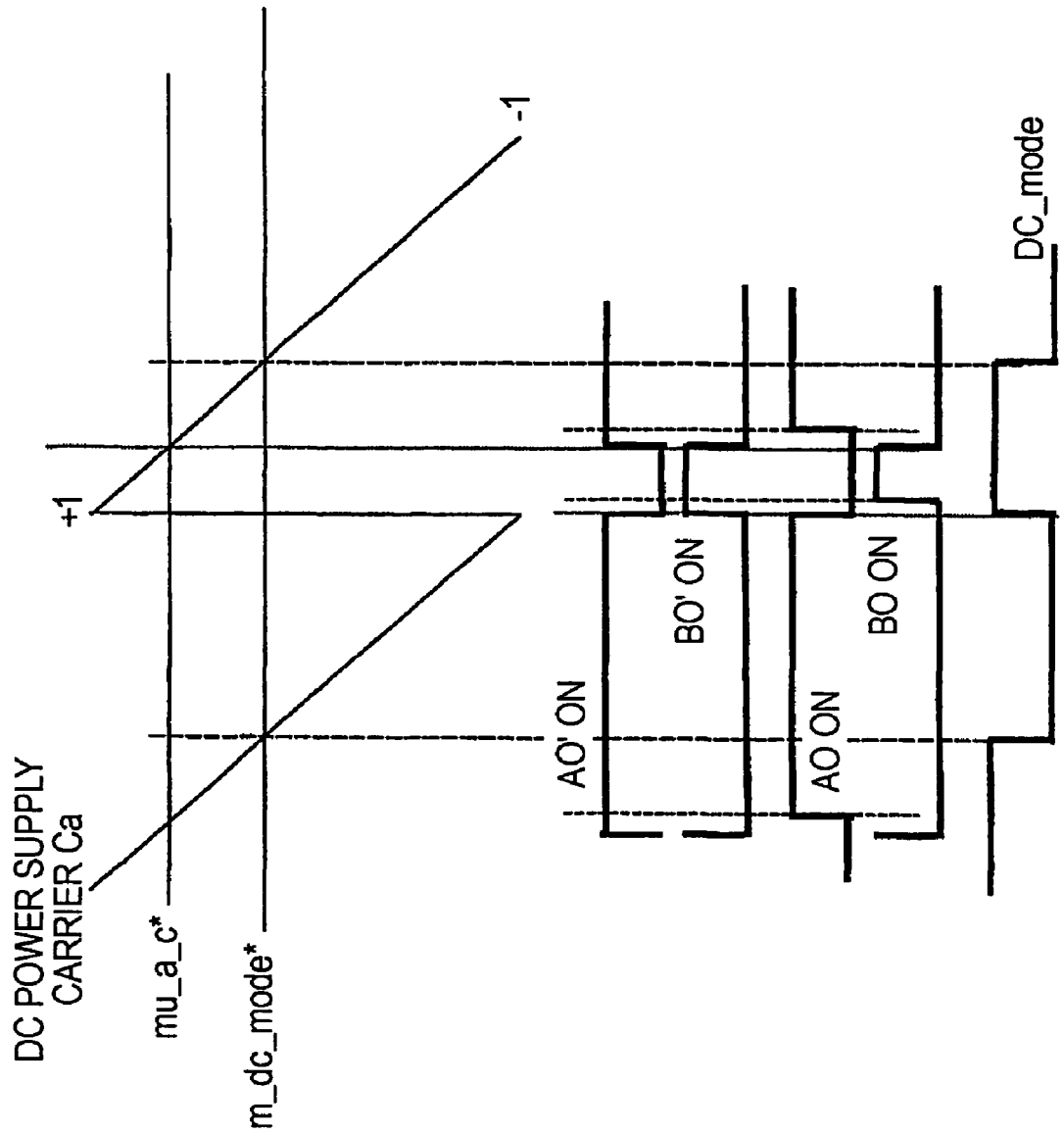
FIG. 15 is a waveform chart illustrating generation of a signal provided with a dead time by sawtooth wave comparison in the second embodiment.

FIG. 15 is a waveform chart illustrating generation of a signal provided with a dead time Td by sawtooth wave comparison in the second embodiment. As shown in FIG. 15, the signal DC_mode is also generated by performing comparison with DC power supply carrier Ca, which is a sawtooth waveform.

Figure 16:
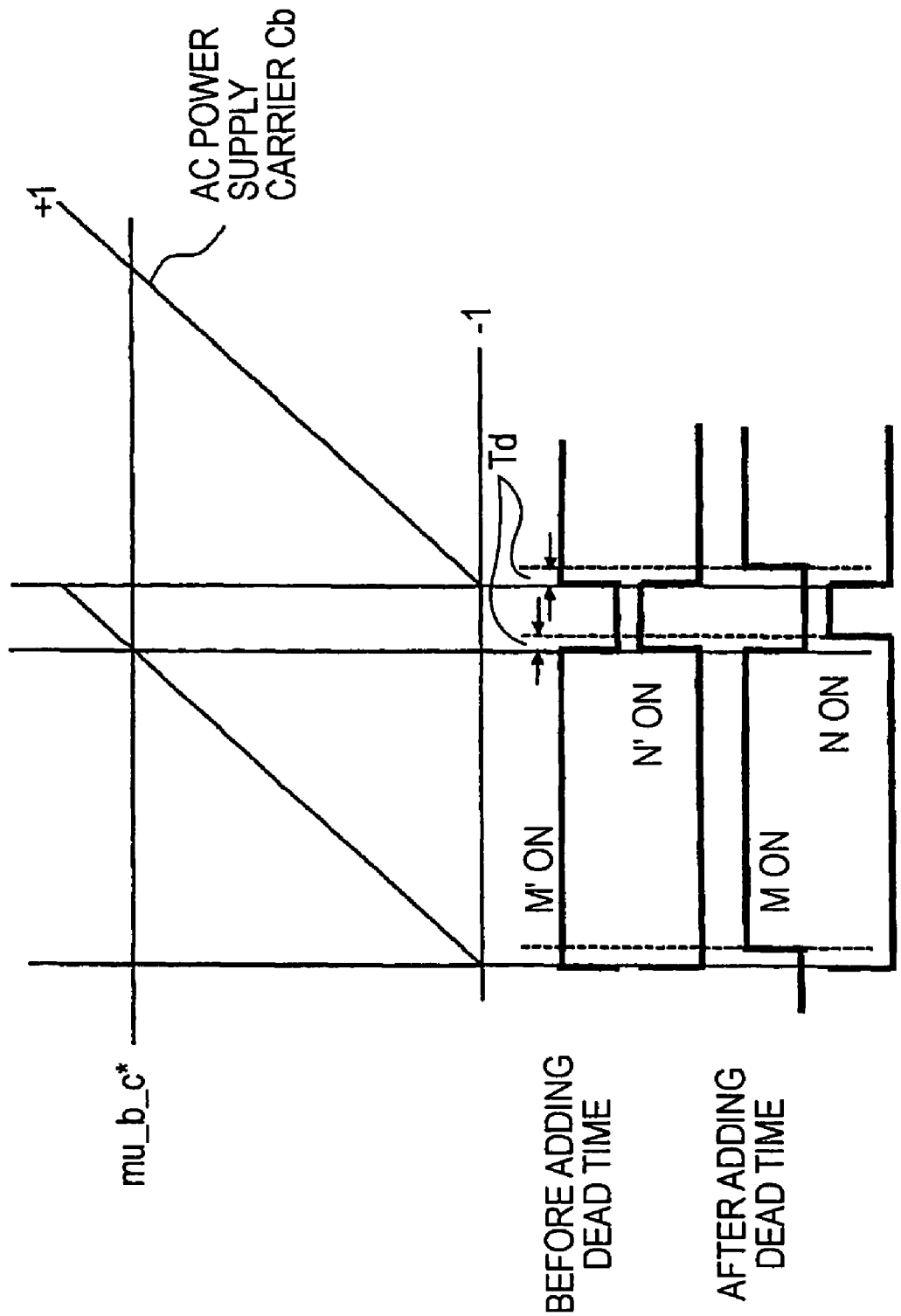
FIG. 16 is a waveform chart illustrating generation of pulse signals M and N by sawtooth wave comparison in the second embodiment.

FIG. 16 is a waveform chart illustrating generation of pulse signals M and N by sawtooth wave comparison in the second embodiment. As shown in FIG. 16, AC power supply carrier Cb also causes generation of pulse signals M and N by using a sawtooth carrier.

Comparison between these carriers and modulation factor command values generates signals A0, B0, C0, D0, E0, F0, M, N, O, P, Q and R.

FIG. 17 is a waveform chart showing a relationship between DC power supply carrier Ca and AC power supply carrier Cb in the second embodiment. As shown in FIG. 17, a phase difference between DC power supply carrier Ca and AC power supply carrier Cb is set so that pulse signal A0 and pulse signal M are adjacent to each other. In the second embodiment, their carriers are set to have a phase difference corresponding to the dead time (Td).

Figure 18A:
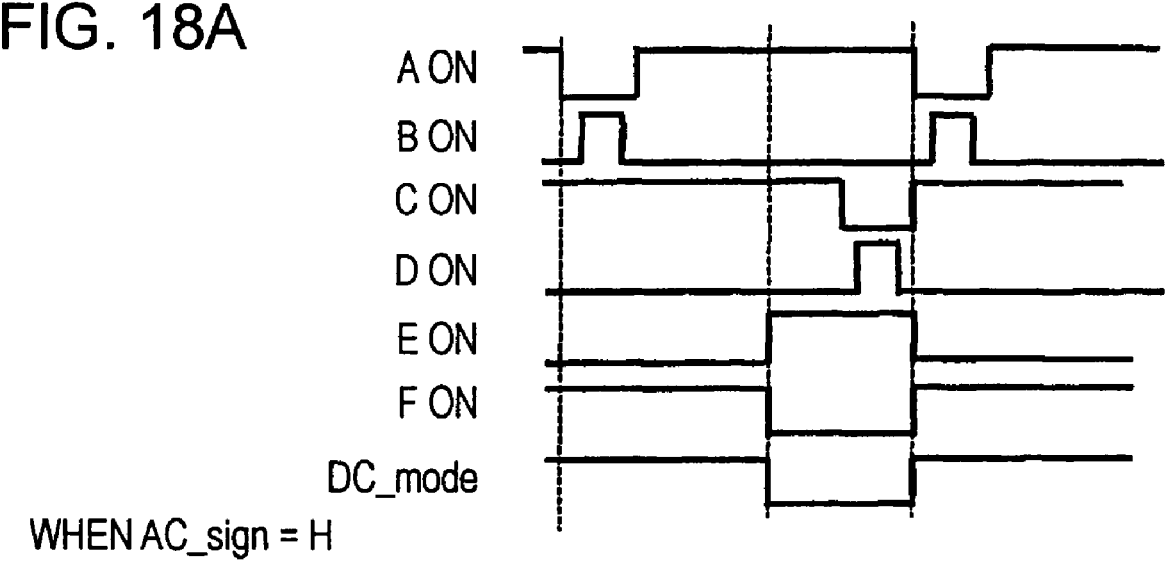
Figure 18B:
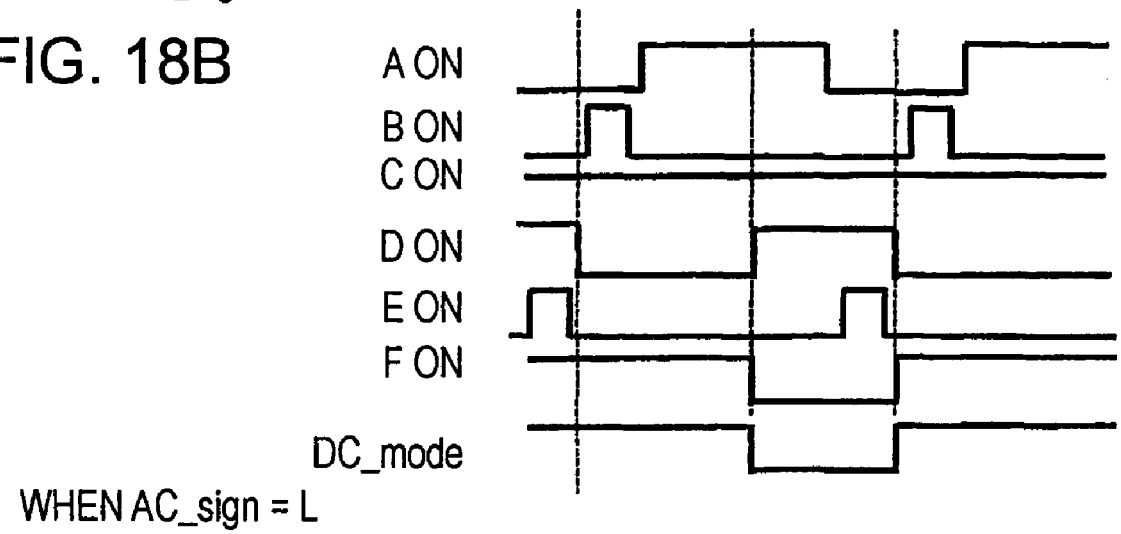

FIGS. 18A and 18B show examples of driving signals that are outputs of the pulse generating portion 46 in the second embodiment. FIG. 18A is a waveform chart showing a case in which the signal AC_sign is H. FIG. 18B is a waveform chart showing a case in which the signal AC_sign is L. The pulse generating portion 46 (see FIG. 5) generates the driving signals A, B, C, D, E and F shown in FIG. 18A when AC_sign is H and generates the driving signals A, B, C, D, E and F shown in FIG. 18B when AC_sign is L.

Examples of outputs obtained when AC sign is L indicate that, by setting pulse signals A0 and M to be adjacent, consecutive OFF intervals of the switch driven by driving signal A appear. In other words, since the number of times switching based on driving signal A is performed can be reduced, a switching loss caused by the switching can be suppressed.

In addition, by generating voltage pulses output from the AC power supply 11b and voltage pulses output from the DC power supply 11a, with both sets to be adjacent, a voltage change between terminals of the switch can be reduced, and a switching loss can be reduced.

In a third embodiment of the invention, at a rise of the driving signal E when AC_sign is L (see FIG. 18B) as described in the second embodiment, the driving signals E and C are set to be ON so as to be superposed on each other. Only differences from the second embodiment are described below.

Figure 19:
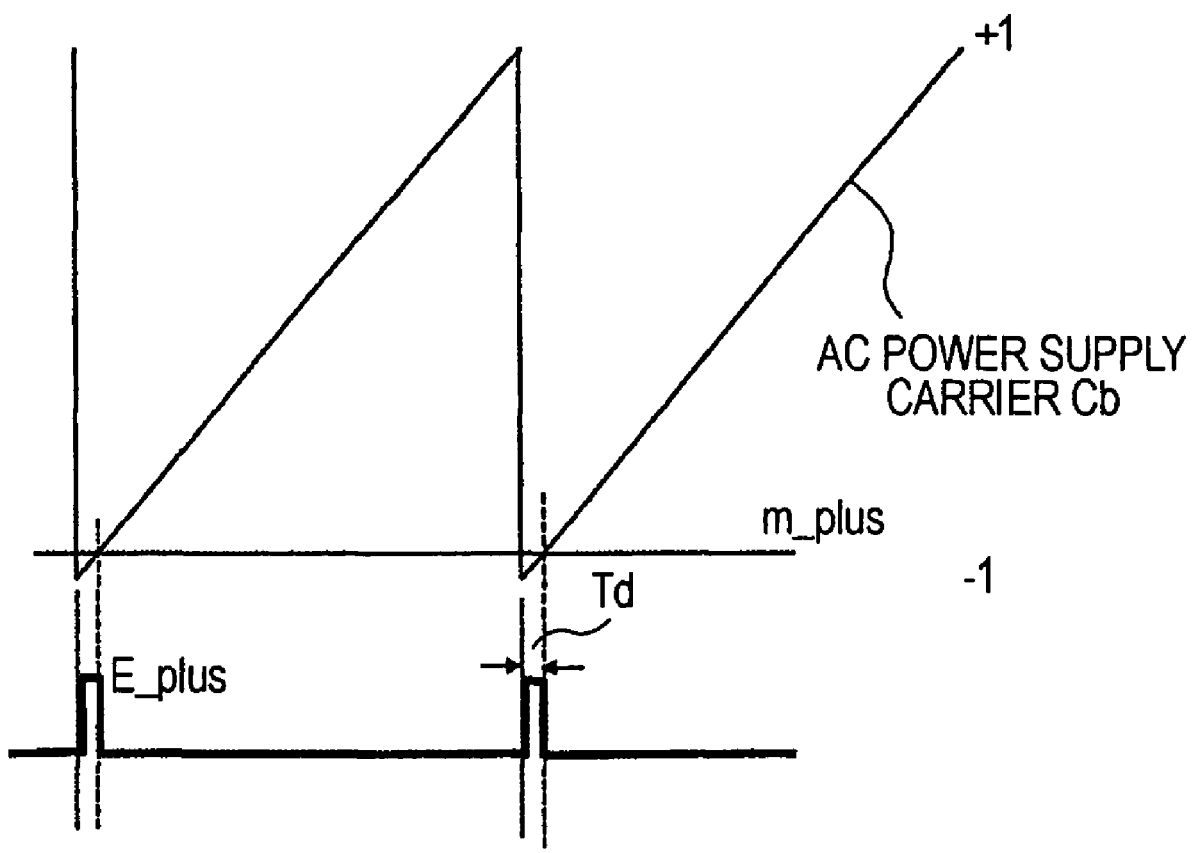
FIG. 19 is a waveform chart illustrating an E_plus signal in a third embodiment.

FIG. 19 is a waveform chart illustrating an E_plus signal in the third embodiment. As shown in FIG. 19, the E_plus signal is generated by performing computation by comparing an m_plus value and AC power supply carrier Ca. The m_plus value is a value based on which the ON time width of the E_plus signal can be set to the dead time (Td).

Figure 20:
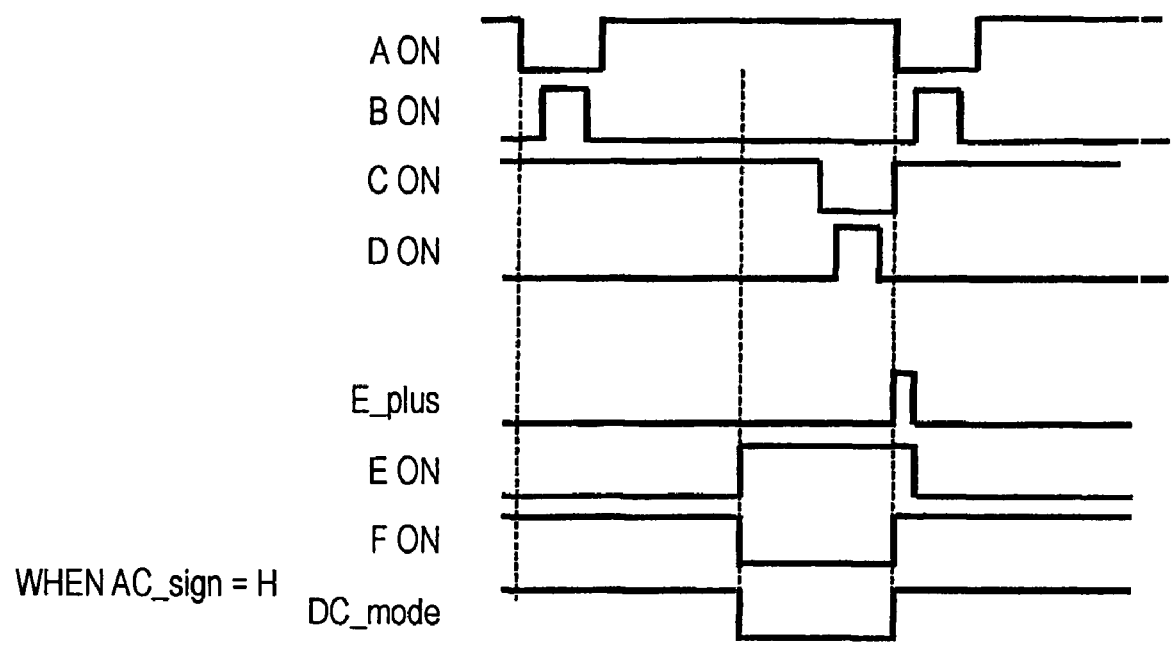
FIG. 20 is a waveform chart showing examples of driving signals when the AC sign signal AC_sign is H in the third embodiment.

In addition, only generation of the driving signal E in the second embodiment is replaced as follows:

$E = (AC\_sign + N \cdot \overline{AC\_sign}) \cdot \overline{DC\_mode} + E\_plus$ FIG. 20 is a waveform chart showing examples of driving signals when the AC sign signal AC_sign is H in the third embodiment. As shown in FIG. 20, by adding the E_plus signal, at a time that DC_mode signal rises, that is, at a time the output is switched from the AC power supply 11b to the DC power supply 11a, a time at which the switch driven by the driving signal C in the return direction and the switch driven by the driving signal E are simultaneously set to be ON can be secured.

In a case such as when a rise of the ON mode of the switch driven by the driving signal C lags behind the driving signal C, by securing the time at which the switch driven by the driving signal E is simultaneously set to be ON, the path of the return current can be also secured. In other words, if the return current path is interrupted, then rapid changes in inductance component and current apply high voltages to switch devices. Thus, the switch devices have voltage capabilities for the voltage application.

In the third embodiment, by simultaneously setting return paths to be ON, the above-described rapid change in current does not occur. Thus, voltage capability of switch device can be lowered.

In addition, a time is secured at which a switch on a path from the output terminal to a high voltage side of an AC power supply bus and a switch on a path from the output terminal to a high voltage side of a DC power supply bus are simultaneously set to be ON. The ON and OFF states of the switches are switched after the time at which the switches are simultaneously set to be ON, whereby even if a switch lags behind a driving signal, simultaneous setting of the switches on the return paths to be ON can lower the switch device withstand voltage without causing a rapid change in current due to interruption of the return current paths.

Figure 21:
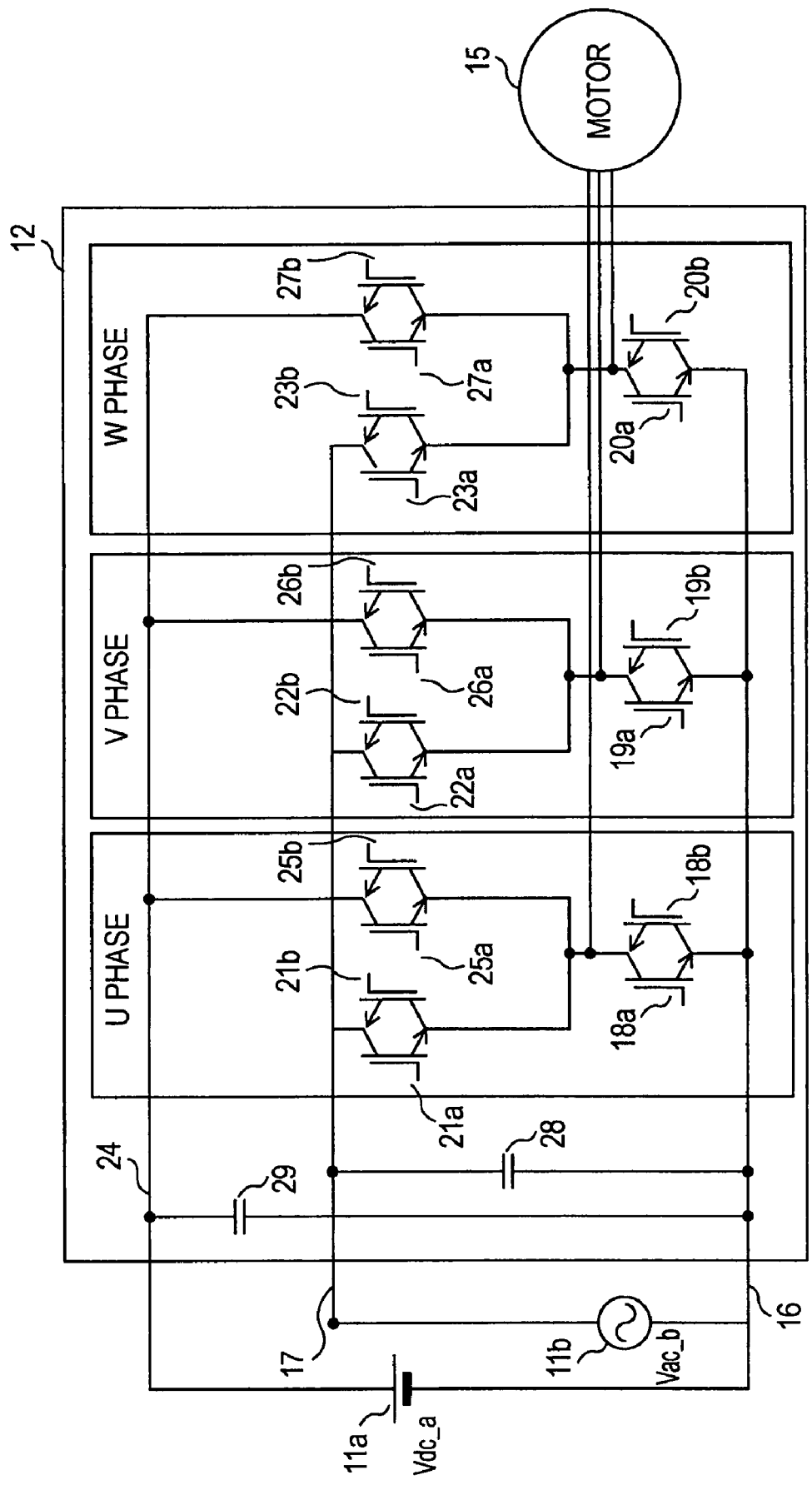
FIG. 21 is a circuit diagram showing the configuration of the power converter in a fourth embodiment.

Next, a power conversion system according to a fourth embodiment of the invention is described below. Only differences from the first embodiment are described. FIG. 21 is a circuit diagram showing the configuration of a power converter 12 in the fourth embodiment. As shown in FIG. 21, in the fourth embodiment, the DC power supply 11a and the AC power supply 11b are connected to each other in parallel.

Regarding the DC power supply 11a and AC power supply 11b connected in parallel, a negative side of the DC power supply 11a and one terminal of the AC power supply 11b are connected to the common bus 16. Sets of a positive bus 24 of the DC power supply 11a and each phase terminal of the motor 15 are connected by pairs of semiconductor switches 25a and 25b, 26a and 26b, and 27a and 27b, which can control bidirectional conduction. Also, sets of a positive bus 17 of the AC power supply 11b and each phase terminal of the motor 11l are connected by pairs of semiconductor switches 21a and 21b, 22a and 22b, and 23a and 23b. Similarly, sets of the negative side of the DC power supply 11a, the common bus 16 to which one terminal of the AC power supply 11b is connected and each phase terminal of the motor 15 are connected by pairs of semiconductor switches 18a and 18b, 19a and 19b, and 20a and 20b.

The smoothing capacitor 29 is connected between the positive bus 24 of the DC power supply 11a and the common (negative) bus 16, and the smoothing capacitor 28 is connected between the bus 17 on the side of the AC power supply 11b and the common bus 16.

For the operation of each switch, control similar to that in the first embodiment can be used. In other words, among the signals output from the pulse generating portion 46, the signals A and C are input to switches connected to the common bus 16, and the signals 1) and E are input to the positive side of the AC power supply 11b, and the signals B and F are input to the positive side of the DC power supply 11a. In this state, measurement with the common bus 16 as a reference may be performed for voltage detection.

As described above, the power conversion system can operate even if the DC power supply 11a and the AC power supply 11b are connected to each other in parallel.

Figure 22:
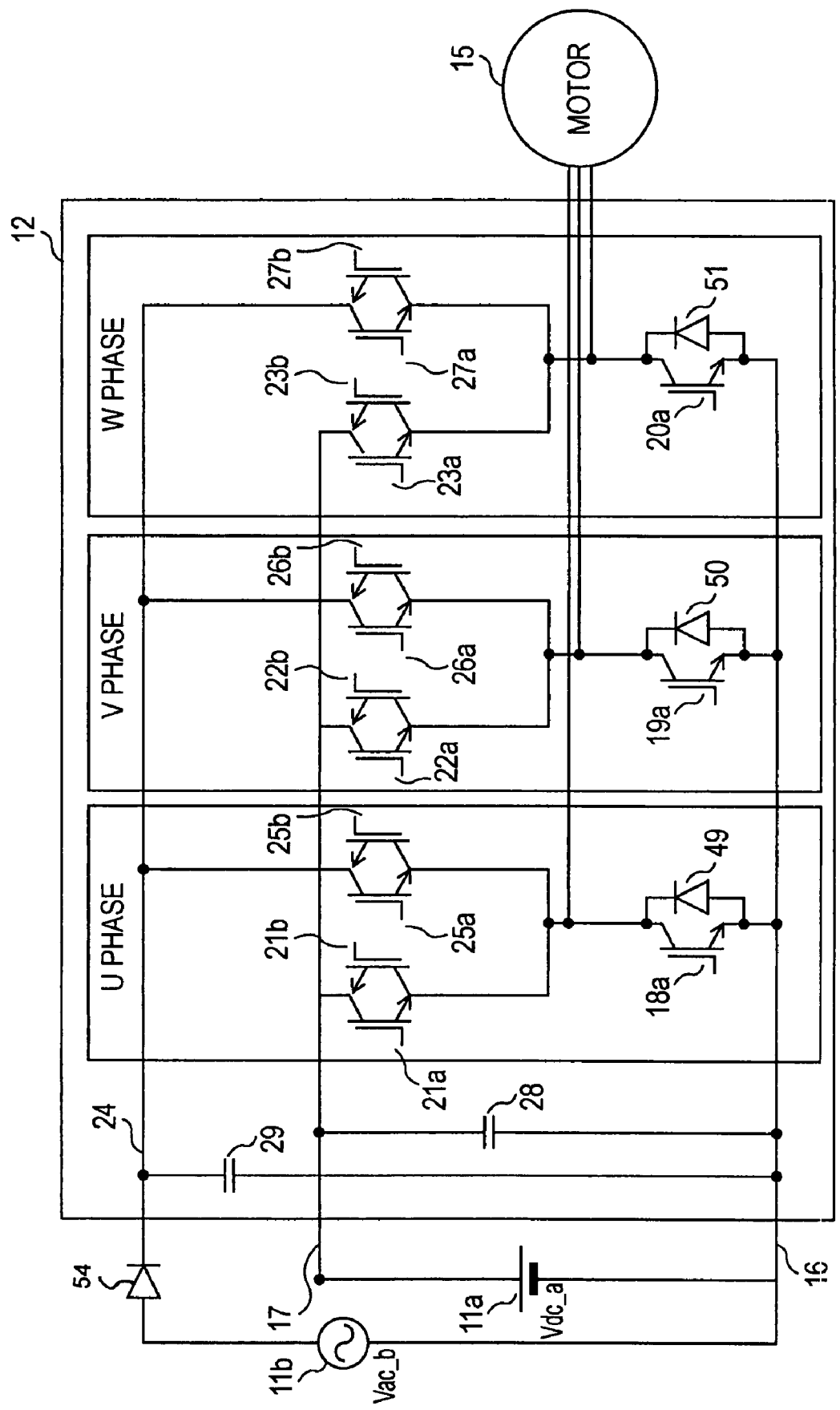
FIG. 22 is a circuit diagram showing a power converter (in a motor driving system) according to a fifth embodiment of the invention.

FIG. 22 is a circuit diagram showing a power converter 12 according to a fifth embodiment of the invention. As shown in FIG. 22, the motor driving system includes a rectification unit 54 between the AC power supply 11b and the power converter 12. Accordingly, the power converter 12 includes diodes 49, 50 and 51 instead of the switches 18b, 19b and 20b. Other components and operation are similar to those in the motor driving system in the fourth embodiment (see FIG. 21).

The rectification unit 54 is formed by a half-wave rectification circuit (here, a diode). By providing the rectification unit 54, the configuration of the power conversion apparatus can be simplified compared with the power conversion control system 10 according to the fourth embodiment.

In addition, by using a full-wave rectification circuit to replace the rectification unit 54 instead of the half-wave rectification circuit, battery charging time can be shortened.

Furthermore, in the case of a limited use under the condition that an input voltage from an external voltage input terminal is less than a battery voltage, instead of switches 21b, 22b and 23b, diodes can be used. This enables further simplification.

Next, a power conversion control system according to a sixth embodiment of the invention is described below. Only differences from the first embodiment are described.

Figure 23:
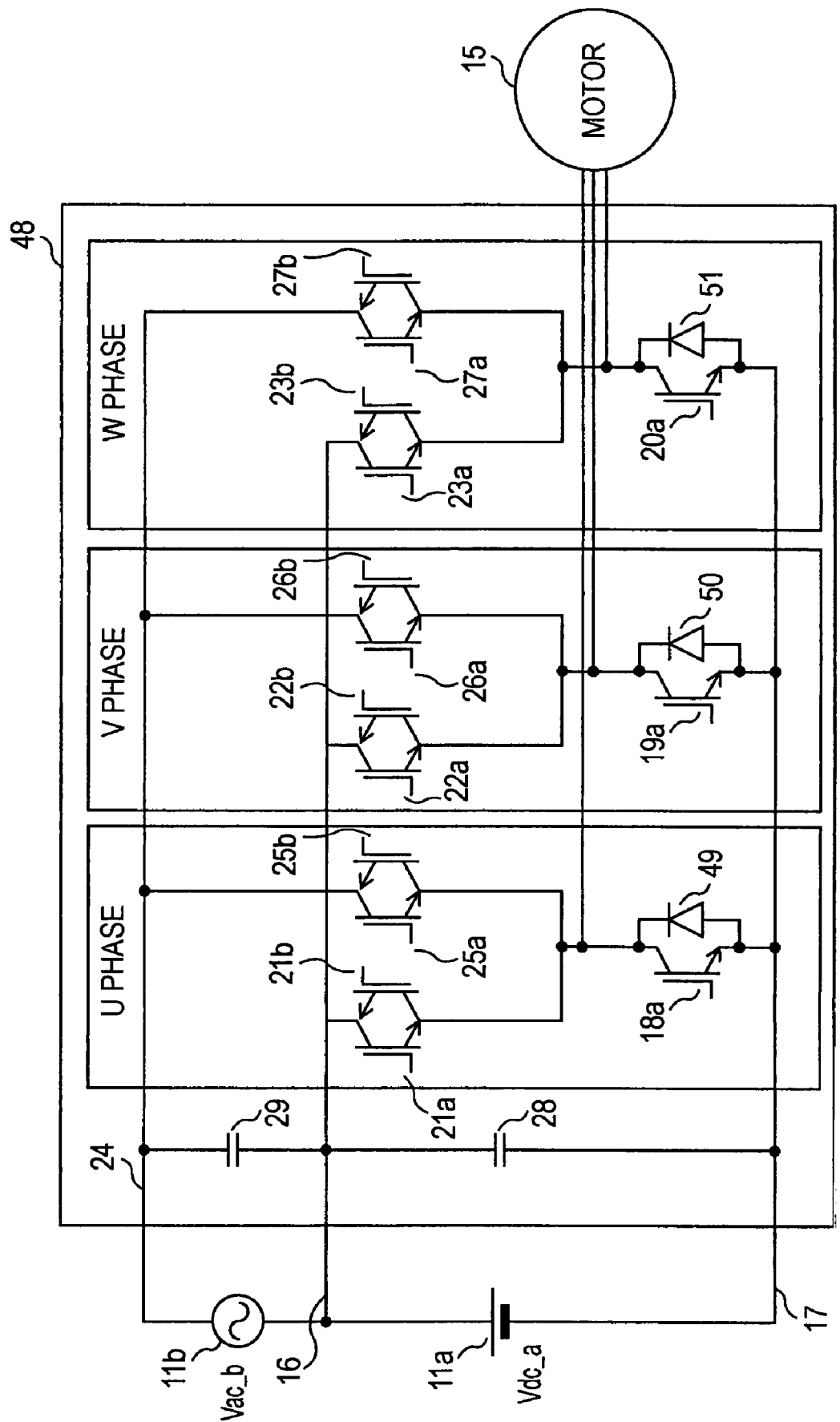
FIG. 23 is a circuit diagram showing the configuration of a power converter in a sixth embodiment.

FIG. 23 is a circuit diagram showing the configuration of a power converter 48 in the sixth embodiment. In the power converter 48, the semiconductor switches 18b, 19b and 20b are respectively replaced by diodes 49, 50 and 51. Other components and operation are similar to those in the power converter 12.

In this case, the voltages Vdc_a and Vac_b of the DC power supply 11a and the AC power supply 11b have the following relationship:

|Vdc_a|>|Vac_b|.

When this voltage relationship holds, if the switch 18b driven by the driving signal F is replaced by the diode 49, no inter-terminal short-circuit current flows when the driving signal E is set to be ON.

By using the DC power supply 11a and AC power supply 11b having the voltage relationship specified to form the power converter 48, the semiconductor elements included therein can be changed from switching elements to diodes. Thus, an inexpensive and small power conversion apparatus can be realized.

As described above, a power conversion apparatus supplies a polyphase AC motor with driving voltages from among output voltages based on a voltage supplied from an AC power supply and a voltage supplied from a DC power supply. The power conversion apparatus includes a conversion unit corresponding to phases of the polyphase AC motor. The conversion unit, in at least one phase, includes a control device that generates driving voltages for the polyphase AC motor by selecting a voltage from among voltages having potential values corresponding to the AC power supply and the DC power supply and uses the selected voltage to operate one switch.

In addition, a modulation factor command value is generated from voltage command values and voltage values corresponding to the AC power supply and the DC power supply. The PWM pulses are generated based on the modulation factor command values corresponding to the AC power supply and the DC power supply, and ON/OFF signals for switching are generated by selection from the PWM pulses.

Therefore, a reduction in number of apparatus components enables reduced size and weight and can prevent an increase in losses.

Also, the above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A power conversion apparatus for supplying a polyphase alternating current motor with driving voltages, comprising:
  a conversion unit adapted to be coupled to phases of the polyphase alternating current (AC) motor, the conversion unit including a plurality of switching devices and including, in each phase:
    a first switching device between a bus of an AC power supply and an output terminal;
    a second switching device between a bus of a direct current (DC) power supply and the output terminal; and
    a third switching device between a common bus for the AC power supply and the DC power supply and the output terminal; and
  a power controller operable to generate driving voltages for the polyphase AC motor by selecting a voltage from among voltages having potential values corresponding to the AC power supply and the DC power supply by operating a switch of the plurality of switching devices.

2. A power conversion apparatus for supplying a polyphase alternating current motor with driving voltages, comprising:
  a conversion unit adapted to be coupled to phases of the polyphase alternating current (AC) motor, the conversion unit including a plurality of switching devices and including, in at least one phase:
    a first switching device between a bus of an AC power supply and an output terminal;
    a second switching device between a bus of a direct current (DC) power supply and the output terminal; and
    a third switching device between a common bus for the AC power supply and the DC power supply and the output terminal; and
  a power controller operable to generate driving voltages for the polyphase AC motor by selecting a voltage from among voltages having potential values corresponding to the AC power supply and the DC power supply by operating a switch of the plurality of switching devices; and wherein the power controller is further operable to:
    generate a first modulation factor command value for the AC power supply from a first voltage value and an AC voltage command value of the AC power supply;
    generate a second modulation factor command value for the DC power supply from a second voltage value and a DC voltage command value of the DC power supply;
    generate pulse-width-modulation pulses based on the first modulation factor command value and the second modulation factor command value; and
    generate ON/OFF signals for the converter unit from a first pulse-width-modulation pulse signal corresponding to the DC power supply, a second pulse-width-modulation pulse signal corresponding to the AC power supply, a signal for selecting one of the AC power supply and the DC power supply, and an AC voltage sign.

3. The power conversion apparatus according to claim 2 wherein the power controller is further operable to, when the voltage of the AC power supply is positive:
  set a first switch on a path from the output terminal to a high potential side of the AC power supply and a second switch on a path from a low potential side of the AC power supply to the output terminal to ON responsive to ON/OFF signals for those of the plurality of switching devices coupled to the AC power supply; and
  generate pulse-width-modulation driving pulses for the polyphase AC motor using a third switch on a path from the high potential side of the bus of the AC power supply to the output terminal and a fourth switch on a path from the output terminal to the low potential side of the AC power supply, the pulse-width-modulation driving pulses responsive to the ON/OFF signals for those of the plurality of switching devices connected to the AC power supply.

4. The power conversion apparatus according to claim 2 wherein the power controller is further operable to, when the voltage of the AC power supply is positive:

set a first switch on a path from a high potential side of the AC power supply to the output terminal and a second switch on a path from the output terminal to a low potential side of the AC power supply to ON responsive to ON/OFF signals for those of the plurality of switching devices coupled to the AC power supply; and generate pulse-width-modulation driving pulses for the polyphase AC motor using a third switch on a path from the high potential side of the bus of the AC power supply to the output terminal and a fourth switch on a path from the low potential side of the AC power supply to the output terminal, the pulse-width-modulation driving pulses responsive to the ON/OFF signals for those of the plurality of switching devices connected to the AC power supply.

5. The power conversion apparatus according to claim 2 wherein the power controller is further operable to:
generate pulse-width-modulation driving pulses for the polyphase AC motor using a first switch on a path from a high potential side of the DC power supply to the output terminal and a second switch on a path from the output terminal to a low potential side of the DC power supply, the pulse-width-modulation driving pulses responsive to the ON/OFF signals for those of the plurality of switching devices connected to the DC power supply.

6. The power conversion apparatus according to claim 2 wherein the power controller is further operable to:
generate the DC voltage command value and the AC voltage command value from a motor current command value dependent on a motor torque command value, a distribution ratio command value representing targeted distribution of power of the AC power supply and power of the DC power supply, and output voltage values of the AC power supply and the DC power supply.

7. The power conversion apparatus according to claim 5 wherein the power controller is further operable to:
generate the first modulation factor command value from the AC voltage command value and a value obtained by inverting a sign of the first voltage value of the AC power supply.

8. The power conversion apparatus according to claim 2 wherein the power controller is further operable to:
generate the signal for selecting the one of the AC power supply and the DC power supply from a distribution ratio command value representing targeted distribution of power of the AC power supply and power of the DC power supply.

9. The power conversion apparatus according to claim 7 wherein the power controller is further operable to:
generate the signal for selecting the one of the AC power supply and the DC power supply by comparing a carrier signal and a power supply selection comparison value responsive to a modulation factor correcting value.

10. The power conversion apparatus according to claim 8 wherein the power controller is further operable to:
obtain the modulation factor correcting value from the distribution ratio command value and the first voltage value of the AC power supply and the second voltage value of the DC power supply.

11. The power conversion apparatus according to claim 5 wherein the power controller is further operable to:
set the motor torque command value to zero;
set a first distribution ratio command value for the AC power supply to a positive value; and
set a second distribution ratio command value for the DC power supply to a negative value; and to thereby charge the DC power supply.

12. The power conversion apparatus according to claim 2 wherein the power controller is further operable to:
generate voltage pulses output from the AC power supply and voltage pulses output from the DC power supply so that the voltage pulses from both power supplies are in a center of a period of a carrier.

13. The power conversion apparatus according to claim 2 wherein the power controller is further operable to:
generate voltage pulses output from the AC power supply and voltage pulses output from the DC power supply so that the voltage pulses from both power supplies are adjacent.

14. The power conversion apparatus according to claim 2 wherein the power controller is further operable to:
set a first switch on a path from the output terminal to a high potential side of the AC power supply and a second switch on a path from the output terminal to a high potential side of the DC power supply to ON responsive to the ON/OFF signals; and
institute a delay time before setting the first switch and the second switch to ON from an OFF state wherein the first switch and the second switch are not ON simultaneously.

15. The power conversion apparatus according to claim 1, wherein:
the AC power supply and the DC power supply are connected to each other in parallel;
the common bus for the AC power supply and the DC power supply is a connection of low potential sides of the AC power supply and the DC power supply; and
the first switching device, the second switching device and the third switching device are bidirectional switches.

16. The power conversion apparatus according to claim 1 wherein:
the AC power supply and the DC power supply are connected to each other in series;
the common bus for the AC power supply and the DC power supply is a connection of a low potential side of the AC power supply and a high potential side of the DC power supply;
the first switching device and the third switching device are bidirectional switches; and
the second switching device includes a switch element for switching on and off unidirectional conduction and a diode for allowing reverse conduction.

17. An automobile, comprising:
an electric motor; and
a power conversion apparatus according to claim 1 and operable to drive the electric motor during a travel state of the automobile.

18. A method for supplying a polyphase (AC) alternating current motor with driving voltages using a conversion unit coupled to phases of the polyphase AC motor, the method comprising:
generating driving voltages for the polyphase AC motor by selecting a voltage from among voltages having potential values corresponding to an AC power supply and a DC power supply; and
using the selected voltage to operate a switch of a plurality of switching devices of the conversion unit, the plurality of switching devices including, in at least one phase, a first switching device between a bus of the AC power supply and an output terminal, a second switching device between a bus of the DC power supply and the output terminal, and a third switching device between a common bus for the AC power supply and the DC power supply and the output terminal.

19. The method according to claim 18, further comprising:

generating a first modulation factor command value for the AC power supply from a first voltage value and an AC voltage command value of the AC power supply;

generating a second modulation factor command value for the DC power supply from a second voltage value and a DC voltage command value of the DC power supply;

generating pulse-width-modulation pulses based on the first modulation factor command value and the second modulation factor command value; and generating ON/OFF signals for the converter unit from a first pulse-width-modulation pulse signal corresponding to the DC power supply, a second pulse-width-modulation pulse signal corresponding to the AC power supply, a signal for selecting one of the AC power supply and the DC power supply, and an AC voltage sign.

* * * * *